US006820104B2

(12) United States Patent
Pelton et al.

(10) Patent No.: US 6,820,104 B2
(45) Date of Patent: Nov. 16, 2004

(54) APPARATUS, METHODS, AND COMPUTER PROGRAM PRODUCTS FOR REDUCING THE NUMBER OF COMPUTATIONS AND NUMBER OF REQUIRED STORED VALUES FOR INFORMATION PROCESSING METHODS

(75) Inventors: Walter Eugene Pelton, 3584 Lancelot Ct., Fremont, CA (US) 94536; Adrian Stoica, Pasadena, CA (US)

(73) Assignee: Walter Eugene Pelton, Fremont, CA (US)

( * ) Notice: Subject to any disclaimer, the term of this patent is extended or adjusted under 35 U.S.C. 154(b) by 686 days.

(21) Appl. No.: 09/878,784

(22) Filed: Jun. 11, 2001

(65) Prior Publication Data

US 2002/0038326 A1 Mar. 28, 2002

Related U.S. Application Data

(60) Provisional application No. 60/210,661, filed on Jun. 9, 2000.

(51) Int. Cl.⁷ .............................................. G06F 17/14
(52) U.S. Cl. ...................................... 708/400; 708/402
(58) Field of Search ................................ 708/400, 401, 708/402, 403, 409, 408

(56) References Cited

U.S. PATENT DOCUMENTS

| | | |
|---|---|---|
| 3,746,848 A | 7/1973 | Clary |
| 3,803,393 A | 4/1974 | Wang |

(List continued on next page.)

FOREIGN PATENT DOCUMENTS

| | | |
|---|---|---|
| EP | 0 075 745 A2 | 4/1983 |
| EP | 0 080 266 A2 | 6/1983 |
| EP | 0 372 566 A2 | 6/1990 |
| EP | 0 441 121 A2 | 8/1991 |
| WO | WO 99/63451 A1 | 12/1999 |
| WO | WO 00/67146 A1 | 11/2000 |

OTHER PUBLICATIONS

*On the Real Time Computation of DFT and DCT Through Systolic Architectures*, N. Rama Murthy et al., IEEE Transactions on Signal Processing, vol. 42, No. 4, Apr. 1994, pp. 988–991.
*A Review of the Discrete Fourier Transform*, Part 1: *Manipulating the Powers of Two*, G. M. Blair, Electronics and Communication Engineering Journal, Institute of Electrical Engineers, London, vol. 7, No. 4, Aug. 1, 1995, pp. 169–177.
*Theory and Application of Digital Signal Processing*, L. R. Rabiner et al., Prentice–Hall, Inc., New Jersey, 1975, pp. 50–56 and 594–603, XP002141966.
*A Comparative Review of Real and Complex Fourier–Related Transforms*, O. K. Ersoy, Proceedings of the IEEE, US, IEEE, New York, vol. 82, No. 3, Mar. 1994, pp. 429–447.
*Numerical Methods*, Numerical Methods, XX, XX, G. Dahlquist et al., 1974, pp. 14–19, XP002116162.

*Primary Examiner*—Kakali Chaki
*Assistant Examiner*—Chat C. Do
(74) *Attorney, Agent, or Firm*—Alston & Bird LLP

(57) ABSTRACT

Apparatus, methods, and computer program products are provided for generating a second set of equations requiring reduced numbers of computations from a first set of general equations, wherein each general equation defines coefficients in terms of a set of samples and a plurality of functions having respective values. A first set of tokens is initially assigned to the plurality of functions such that every value of the functions that has a different magnitude is assigned a different token, thereby permitting each general equation to be defined by the set of samples and their associated tokens. Each general equation is then evaluated and the samples having the same associated token are grouped together. A second set of tokens is then assigned to represent a plurality of unique combinations of the samples. The second set of equations is then generated based at least on the first and second sets of tokens.

23 Claims, 1 Drawing Sheet

U.S. PATENT DOCUMENTS

Figure 1:
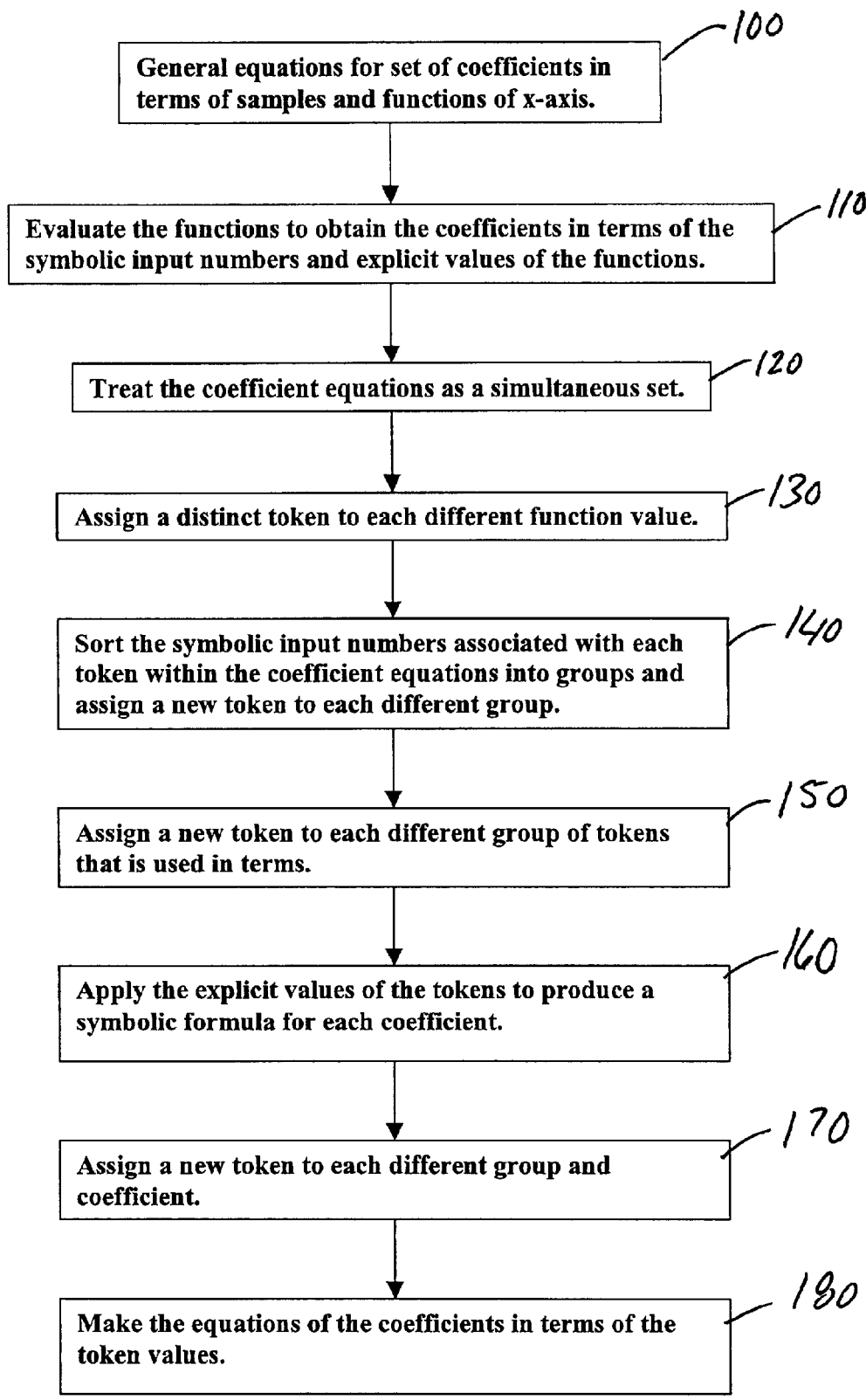

| | | | |
|---|---|---|---|
| 4,023,028 A | 5/1977 | Dillard | |
| 4,225,937 A | 9/1980 | Perreault et al. | |
| 4,581,715 A | 4/1986 | Hyatt | |
| 4,868,776 A | 9/1989 | Gray et al. | |
| 4,929,954 A | 5/1990 | Elleaume | |
| 5,007,009 A | 4/1991 | Azetsu | |
| 5,233,551 A * | 8/1993 | White | 708/408 |
| 5,245,564 A | 9/1993 | Quek et al. | |
| 5,504,690 A | 4/1996 | Kageyama et al. | |
| 5,515,308 A | 5/1996 | Karp et al. | |
| 5,563,818 A | 10/1996 | Agarwal et al. | |
| 5,784,307 A | 7/1998 | Sheaffer | |
| 5,818,745 A | 10/1998 | Sheaffer | |
| 5,847,977 A * | 12/1998 | Jhung | 708/402 |
| 6,038,579 A | 3/2000 | Sekine | |
| 6,127,863 A | 10/2000 | Elliott | |
| 6,240,338 B1 | 5/2001 | Peterson | |
| 6,240,433 B1 | 5/2001 | Schmookler et al. | |
| 6,263,257 B1 | 7/2001 | Aemmer | |
| 6,304,887 B1 | 10/2001 | Ju et al. | |
| 6,434,583 B1 | 8/2002 | Dapper et al. | |
| 6,496,795 B1 | 12/2002 | Malvar | |
| 6,735,610 B1 * | 5/2004 | Pelton | 708/405 |

* cited by examiner

APPARATUS, METHODS, AND COMPUTER PROGRAM PRODUCTS FOR REDUCING THE NUMBER OF COMPUTATIONS AND NUMBER OF REQUIRED STORED VALUES FOR INFORMATION PROCESSING METHODS

CROSS-REFERENCE TO RELATED APPLICATIONS

The present application claims priority from U.S. provisional patent application Ser. No. 60/210,661, entitled: METHODS AND APPARATUS FOR PROCESSING INFORMATION USING SPECIAL CASE PROCESSING, filed on Jun. 9, 2000, the contents of which are incorporated herein by reference.

FIELD OF THE INVENTION

The present invention relates generally to the determination of coefficients of a function. More particularly, the methods and computer program products of the present invention relate to reducing the number of computations and values that must be stored in the determination of the coefficients.

BACKGROUND OF THE INVENTION

Signal processing is an important function of many electronic systems. In particular, in many electronic systems, data is transmitted in signal form. Further, some electronic systems analyze and monitor the operation of mechanical or chemical systems by observing the characteristics of signals, such as vibration signals and other types of signals, that are output from these systems. In light of this, methods have been developed to characterize signals such that information or data in the signal is available for data processing.

As one example, in many electronic systems, time domain signals are typically transformed to the frequency domain prior to signal processing. A typical method for converting signals to the frequency domain is performed using Fourier Transforms. The Fourier Transform of a signal is based on a plurality of samples of the time domain signal taken over a selected time period, known as the base frequency. Based on these samples of the signal the Fourier Transform provides a plurality of coefficients, where the coefficients respectively represent the amplitude of a frequency that is a multiple of the base frequency. These coefficients of the Fourier Transform, which represent the signal in the frequency domain, are then used by electronic systems in processing the signal.

Although Fourier Transforms are among some of the most widely used functions for processing signals, there are other functions that are either currently used or will be used in the future, as a better understanding of their applicability is recognized. These functions include Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, and a variety of Matrices used in Quantum Mechanics, Linear Analysis functions, wavelets and fractals just to name a few.

Although Fourier transforms and the other functions mentioned above are useful in determining characteristics of signals for use in data processing, there are some drawbacks to their use. Specifically, application of these functions to signals is typically computationally intensive. This is disadvantageous as it may require the use of specialized processors in order to perform data processing. Further, and even more importantly, the time required to perform the number of computations using these functions may cause an unacceptable delay for many data processing applications. In fact, a goal of many data processing systems is the ability to process data signals in real time, with no delay.

For example, the Fourier Series is defined as an infinite series of coefficients representing a signal. To transform a signal using a Fourier Series would require an infinite number of computations. To remedy this problem, many conventional data processing systems use Discrete Fourier Transforms (DFT), as opposed to the infinite Fourier Series. The DFT is the digital approximation to the Fourier Series and is used to process digitized analog information. Importantly, the DFT replaces the infinite series of the Fourier Series with a finite set of N evenly spaced samples taken over a finite period. The computation of the DFT therefore provides the same number of coefficients as the samples received, instead of an infinite number of samples required by the Fourier Series. As such, use of the DFT provides the most satisfactory current means to process the signal.

Because of the importance of reducing the time required to process signals, however, methods have been developed to further reduce the number of computations required to perform a DFT of a signal. Specifically, the DFT procedure computes each coefficient by a similar process. The process for a general coefficient is; multiply each sample by the sine or cosine of the normalized value of the independent variable times the angular rate and sum over all of the samples. This procedure defines N multiply-add steps for each of N coefficients, which in turn, equates to $N^2$ multiply-add computations per DFT. As many samples of a signal are typically required to perform an adequate approximation of the signal, the DFT of a signal is typically computational and time intensive.

One of the methods developed to reduce the number of computations is the Butterfly method, which reduces the number of computations from $N^2$ to N times log (N). The Butterfly method is based on the fact that many of the trigonometric values of the DFT are the same due to periodicity of the functions. As such, the Butterfly method reduces the matrix associated with the DFT into N/2 two-point transforms (i.e., the transforms representing each coefficient $a_n$ and $b_n$). The Butterfly method further reduces the redundant trigonometric values of the DFT. Although the Butterfly method reduces the number of computations over the more traditional DFT method, it also adds complexity to the Fourier transformation of a signal. Specifically, the Butterfly method uses a complex method for addressing the samples of the signal and the matrix containing the functions. This complexity can require the use of specialized processors and increase time for computation of the Fourier Transform. By its nature, the Butterfly is a batch process, which does not begin determination of the coefficients until after all of the samples have been received. Consequently, this method causes latency in the determination of the coefficients of the function, where the time between the arrival of the last sample and the availability of the coefficients is defined as the latency of the system.

An improved approach to reducing the time required to process signals is described in U.S. application Ser. No. 09/560,221 entitled: APPARATUS, METHODS, AND COMPUTER PROGRAM PRODUCTS FOR DETERMINING THE COEFFICIENTS OF A FUNCTION WITH DECREASED LATENCY filed Apr. 28, 2000 and corresponding PCT Application Number WO 00/67146, entitled:

Computation of Discrete Fourier Transform, publication date Nov. 9, 2000. These applications are assigned to the inventor of the present application, and are incorporated herein by reference. The approach in WO 00/67146 reduces or eliminates the problem of latency for processing coefficients by using the property of independence of samples of functions like the DFT. The approach updates at least one of the coefficients of the function prior to receipt of the last sample of a sample set thereby reduce latency.

Despite the improvements in data processing accomplished by the apparatus and methods of U.S. Pat. No. 6,735,610), there are continuing needs to reduce the number of calculations required stored terms for determining the coefficients of a function.

SUMMARY OF THE INVENTION

As set forth below, the apparatus, methods, and computer program products of the present invention overcome many of the deficiencies identified with processing signals using functions, such as Fourier Transforms. In particular, the present invention provides methods and computer program products that determine the coefficients of a function representative of an input signal with reduced calculation complexity, such that the coefficients of the function are made available within a decreased time from receipt of the last sample of the signal. The present invention also provides methods and computer program products that reduce the amount calculations that must be performed in order to determine the coefficients of a function, such that less complex hardware designs can be implemented. Specifically, the time for performing computations can be conserved by reusing previously calculated terms so that terms having the same value are calculated fewer than the number of times that the term appears in the original equations; preferably only one calculation for each repeating term having the same value for the entire calculation process. In addition, some embodiments of the present invention also use a reduced number of values to represent the possible mathematical terms of a function.

BRIEF DESCRIPTION OF THE DRAWING AND TABLES

FIG. 1 is a block diagram illustrating the operations for generating a special case set of equations for converting input values to coefficients with reduced computation from a more general set of equations according to one embodiment of the present invention.

Table 1 illustrates use of the operations of FIG. 1 to reduce the number of calculations for determining the Fourier Transform of a signal based on eight samples according to one embodiment of the present invention.

Table 2 illustrates use of the operations of FIG. 1 to reduce the number of calculations for determining the Discrete Cosine Transform of a signal based on eight samples according to one embodiment of the present invention.

Table 3 illustrates use of the operations of FIG. 1 to reduce the number of calculations for determining the One-Dimensional Discrete Cosine Transform of a signal based on sixteen samples according to one embodiment of the present invention.

Table 4 illustrates use of the operations of FIG. 1 to reduce the number of calculations for determining the Fourier Transform of a signal based on eight samples according to another embodiment of the present invention.

Table 5 illustrates use of the operations of FIG. 1 to reduce the number of calculations for determining the Fourier Transform of a signal based on eight samples using a different starting from that of Table 4 according to another embodiment of the present invention.

Table 6 illustrates use of the operations of FIG. 1 to reduce the number of calculations for determining the Two-Dimensional Discrete Cosine Transform of a signal based on eight sets of eight samples each according to one embodiment of the present invention.

Table 7 illustrates use of the operations of FIG. 1 to reduce the number of calculations for determining the Two-Dimensional Discrete Cosine Transform of a signal based on sixty-four samples each according to one embodiment of the present invention.

Table 8 illustrates use of the operations of FIG. 1 to reduce the number of calculations for determining the Discrete Cosine Transform of a signal based on eight samples according to another embodiment of the present invention.

Table 9 illustrates use of the operations of FIG. 1 to reduce the number of calculations for determining the Fourier Transform of a signal based on eight samples according to another embodiment of the present invention.

Table 10 illustrates use of the operations of FIG. 1 to reduce the number of calculations for determining the Discrete Cosine Transform of a signal based on eight samples according to another embodiment of the present invention.

Table 11 illustrates use of the operations of FIG. 1 to both reduce the number of calculations for determining the Fourier Transform and Discrete Cosine Transform of a signal based on sixteen samples according to alternative embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For illustrative purposes, the various methods and computer program products of the present invention are illustrated and described below in conjunction with the characteristics of Fourier Series. It should be apparent, however, that the methods and computer program products of the present invention can be used with many different types of functions. For instance, the methods and computer program products may be used with functions such as Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, and a variety of Matrices used in Quantum Mechanics, Linear Analysis functions, wavelets and fractals. This list is by no means exhaustive and is provided as mere examples. The approach may be applied to any function that can be expressed as a matrix of values. The usefulness of the application of these and other functions not listed above is quite general. The method of the present invention provides a way to develop apparatus, methods, and computer program products for parallel computing and remove calculation redundancy in a rote manner, which is compatible with machine execution.

One implementation of the present invention would be in a general purpose computer program to examine each class of problem and write a minimal execution program or design an apparatus for each specific case of the function. In this application, it would be a programming aid.

In particular, the present invention provides methods and computer program products that remove redundancy from a mathematical procedure for determining coefficients of a function. The present invention is particularly suited to use in systems that employ coefficient-based mathematics.

Some of methods and computer program products of the present invention provide a sequence of operations in which a working formulation or program is examined to identify the functional usage of each part. By classifying the various details of the program and then following rules of combination or substitution that are universal, the number of computations and/or required stored values for a given computational determination may be reduced. As with any algebra, it becomes possible to do significant reconfiguration without knowing the behavior of the actual computational system. The functionality of the entire program is preserved while the process is changed to another form. The form is then algebraically manipulated to optimize speed or whatever parameters are desired.

It is often possible to reduce one or more variables out of a system that has many variables. If only part of the possibilities are addressed at one time this process can be repeated later to handle others. Some of the variables that yield gains when methods according the present invention are applied include the number of bits at various locations, the number of coefficients being formed, and any other aspect that defines the structure.

The number of bits can be used in several ways. One way is simply to detail each of the values of that many bits. Another is to have a continuous function that will be represented in a specific number of bits. If the actual values are to be represented in a small number of bits, it may be that several values of the function will be represented by a single number. In this case, it becomes important to know the correctly rounded points so that no systematic bias will be introduced. Once that has been done correctly, there will be a reduction in the total number of discrete terms and individual computations that must be made available to the process.

The resulting structure is then sorted and processed to algebraically format the output in some basic manner. Typically, the individual formulas of the output terms are related to the primary input terms. Where numbers have replaced the previous functions, the additions are carried out. Once the processing is done, there may be some number of simultaneous equations that share some variables.

The next step is a three-fold set of details to be identified and collected. The first is to identify those variables that are used in identical combinations in different terms of each output function. The second one is to separately determine those variables that are used in identical combinations in various output functions. Finally, the variables should be linked temporally so as to be able to find the time at which storage must be allocated or when all of the members of a group become available. Ordering them temporally in each combinatorial representation can do this. They may be placed in the order of occurrence. It is then easy to access the first member to know when an accumulation site is required. Similarly, it is easy to access the last member to determine the time when all members have become available. The term temporal may be the wrong term when the samples were not from a time-oriented process, but these processed are done on an ordered set of numbers and the order may be artificially be correlated with time.

There may be need to minimize the number of accesses or the number of storage locations or a limit according to specific guidelines. These rules control the next steps to form groups. In the examples supplied, it was necessary to minimize the number of multiplies first. It was then required to minimize the number of add-accumulates. Next, minimize the number of individual storage registers. It is usually beneficial that once a register contains a variable, the variable would not be transferred to other register locations because it allows the registers to be called by the name of the variable it contains and also reduces the number of processing steps defined. After such a variable is used for the last time there may be a newly formed variable that cam be assigned to the same register in which case there is value in keeping the register/variable name but changing a prefix or suffix portion. Finally, each output term is to be formed as soon as it becomes determined by the input information. Following this rule is generally beneficial in making the final output available at the earliest time without having to use multi-pass compiling methods at this level. The procedures do not alter the eventual set of coefficients.

The result is a set of intermediate variables that are each derived from lower variables by a multiply or add process. The actual definition of the intermediates actually contains all of the information required to structure the implementation. The output equations are a sum or product of variables that are defined sequentially descending to the primitives.

| | Definitions: |
|---|---|
| Alpha (parameters) | Any general formula appearing at a location. |
| Beta (parameters) | A numerical value occurring at context/status. |
| T (index) | Token - a numerical value given a symbol. |
| Sum (index) | Chunk - a set of input variables summed. |
| Gamma (index) | Term - the product of a chunk and a token. |
| C (j) | Coefficient with index j, an output member. |
| S (i) | Sample with index i, a member of the ordered input set. |

With regard to FIG. 1, the basic steps for forming the special case equations is illustrated. Specifically, first the general equations for a set of coefficients are expressed in terms of samples and functions of the x-axis that define the coefficients. (See step 100). The functions are next evaluated to obtain the coefficients in terms of symbolic input numbers and explicit values of the functions. (See step 110). The coefficient equations are then treated as a set of simultaneous equations, (see step 120), and a distinct token is assigned to each different coefficient function value. (See step 130). The symbolic input numbers now associated with each assigned token is sorted within the coefficient equations into groups and assign a new token to each different group. (See step 140). A new token is then assigned to each different group of tokens that is used in the terms. (See step 150). Explicit values of the tokens are then applied to produce a symbolic formula for each coefficient. (See step 160). New token values are then equations are then rewritten in terms of the token values. (See step 180). After the equations have be rewritten, the apparatus methods and computer program products of the present invention may use the equations to determine the coefficients of a function based on a set of samples.

Stated in a somewhat different way, the apparatus, methods, and computer program products of the present invention generate a second set of equations requiring reduced numbers of computations from a first set of general equations, where each general equation defines coefficients in terms of a set of samples and a plurality of functions having respective values. A first set of tokens is initially assigned to the plurality of functions such that every value of the functions that has a different magnitude is assigned a different token, thereby permitting each general equation to be defined by the set of samples and their associated tokens. Each general equation is then evaluated and the samples having the same associated token are grouped together. A second set of tokens is then assigned to represent a plurality of unique combinations of the samples. These second set of tokens are then evaluated to determine a third set of tokens that define all the unique tokens of the second set of tokens. This repeated until there are no more redundant tokens. The second set of equations is then generated based on the sets of tokens.

Details of the DFT Example

It is easiest to view the process as an Output-Oriented Methodology. For the DFT there are N coefficients to be derived from N samples. Each sample is going to be multiplied by a function of the sample position and the specific coefficient. Since a sample has one sample position and will be used in N coefficients, we can designate it by a generic name and two parameters. The generic name is the name we pick for the initial level of abstraction. Let us pick Alpha. The parameters may be shown as matrix indices. For the current discussion Alpha (i, j) is used to represent the function which evaluates to become the multiplier of the $i^{th}$ sample position for the $j^{th}$ output coefficient. The indices i and j range from 1 to N. Let i represent the sample positions and j represent the coefficient being referenced.

For the DFT, the Alpha (i, j) is cos (2*Pi*i*j/N) or sin (2*Pi**i*j/N) (in here, as well as in the Tables, Pi is notation for π=3.14 . . . ). Once N is decided, there is a numerical value for each Alpha (i, j). The numerical value will be referred to as Beta (i, j). In the example case there are N times N numerical values designated Beta (i, j).

The first operation is to form a list of values. As a designator for the values that we will call tokens, we will use T (m). We begin by setting T (1) equal to Alpha (1,1). We may now proceed in an orderly manner to compare each Alpha (i, j) to T (1). If it is equal we add Alpha (i, j) to the list for T (1), if it is not equal we compare it to T (2) if one has been assigned a value. If it is numerically equal we add it to the list for T (2). If it does not equal any assigned T-value, we assign it to T (v) where v is the next unassigned index for T. Upon completion, we will have N squared entries. There will be tokens T (1) . . . T (v-1). Each Alpha (i, j) may now be replaced by a T (m) whose numerical value is stored in the list and a sign where the Alpha was numerically equal but opposite in value. If at least one of the values of Alpha (i, j) occurred twice, this process results in a simpler array. As a convention, we will only allow positive values or zero for T (m). All sign information will be left in the equations. Similar simplifications may be done where we check for multiples of Alpha (i, j) or functions of i and j, but in this example we will use only equal amplitudes.

The second operation is done with the tokens applied. We express each output function (coefficient C (j),) as the sum of each sample times the token linked with its sample position and the appropriate sign. Each token is multiplied by the sum of all of the samples of the sample positions whose Alpha (i, j) were listed as having the value of that token in the first operation. This operation consists of collecting all of the identical tokens by summing the associated samples into a single term and then multiplying by the token value. The form of each output function becomes a summation of token products. In this, case j is associated with any one coefficient, so that we are collecting across the i sample positions of each coefficient.

Let us choose to call the individual samples by a symbol and an index. The samples may be denoted S(i). The samples are the actual variables that represent input information in the final structure. We may then represent the $j^{th}$ coefficient by:

$$C(j)=T(1)*(\Sigma S(dk1))+T(2)*(\Sigma S(dk2))+\ldots T(m)*(\Sigma S(dn)).$$

It follows that the number of multiplies is reduced by each time a token is reused in a coefficient.

Listing the groupings of S(i)*T(m) that occur across the various coefficients, C(j), achieves the next two operations. It is obvious that there are no common groupings of S(i)s within a coefficient because each sample is only used one time. The S(i)s are added to form groups. Certain S(i)s are summed and multiplied by a token. When forming various coefficients the same summation will be used again with another sign or multiplied by another token. It is important to reuse the case where the multiply is by the same token and also the reuse of the summation which will be multiplied by another token and used multiple times.

The next operation is achieved by listing the combinations found in each summation in each coefficient in much the same way as was done in the first operation. It is useful to keep the sample symbols in the order of occurrence within each summation. We will designate the summations by the term chunk. These will be named Sum(1) through Sum(s). A list is formed with the first chunk listed under Sum(1). The second chunk will be compared with it and added to its list if it is identical, else it will be named Sum(2) and so listed. Continue by repeating steps from first operation.

After the coefficients are represented by chunks with signs preserved and times tokens, a list will be made that groups the products of tokens and chunks. These are called terms Gamma(1) through Gamma(t). Terms again are only considered as symbols and signs are preserved as before. Once there is a list of terms which breaks down into a list of chunks, etc. we have the minimum set of elements that are required to produce the set of coefficients.

Description of an Example Implementation

The first constructor is the range of each chunk. Here we want to identify the first and last sample times contained in each. This is where the value of sample order becomes apparent. Storage will be required from the first required sample time. Similarly, the chunk cannot be multiplied by any of the tokens until it is finished. Because the S(j) are ordered in the chunk definitions listed, no further processing steps are needed at this time.

The second constructor is the sequence of combinations from which to generate the chunks. The general procedure here is to allocate N+1 storage locations in which to fabricate the final coefficients. It will follow that the first samples can be placed in two locations each and then later samples can be accumulated in the locations. Maintaining the constraint allows the correct solution to be achieved by trial and error. There are geometric and other procedures that also produce the same answer in the case of DFT but they are equivalent and require more words to state. Examples of these procedures are to be seen in the following illustrations.

There is no single formula for all types of structures, therefore the trial and error method is a suitable example.

Once the chunks are formed it is possible to produce the terms using the same storage locations but by multiplying and accumulating. The terms are then finally combined into coefficients by add-accumulate procedures. In the more general case, there are other strategies, but these are well-known and would be obvious to anyone skilled in the art.

A Computation Minimization of the Discrete Fourier Transform

The DFT has been the subject of much development recently. The FFT has been widely accepted as an efficient method of calculation. The FFT requires N*Log (N) multiplies instead of $N^2$ for previous methods. The FFT appears to require the least computation of any easily stated paradigm. Embodiments of the present invention provide methods that can be much simpler to execute the FFT. The paradigm uses the least processing power.

An example of a method according to one embodiment of the present invention will now be presented. Although the method of this example can derive a precise minimum computational structure for a certain value of N, the method does not necessarily specify the structure for another value of N. This example will show the case where N=8. The procedures described can be programmed so that it is possible to mechanically develop the equations for any given N.

Reference is now made to Table 1. Section 1 of Appendix 1 shows the terms that define an 8 by 8 DFT. According to the methods of the standard technologies, each sample along the top must be multiplied by each of the entries below it (i.e. sixty-four multiplications to be performed), and then the products along each row must be summed to produce the coefficient associated with the row. However, embodiments of the present invention significantly can reduce the number of multiplication steps.

Since the trigonometric functions are actually static in this structure, they have numerical values. In Section 2, the mathematical evaluations have been performed and the numerical values have been substituted. In each case, the value consists of a sign and a number. These must each be multiplied by the applicable sample value and then summed across the row to form the coefficient. (See steps 100–120).

As can be seen, there are cases where the numerical value of the entry repeats several times although the sign may reverse, and each sample may have any value in its permitted range. In Section 3, each numerical value other than zero has been assigned a token and the sign has been preserved. (See step 130). Of course, there is no significance to sign in the case of zero.

An algebraic development will now be started. In Section 4, a new column is marked 'Formula'. The sample numbers are grouped and multiplied by the appropriate tokens. In A0 as an example, the formula is the sum of all of the samples multiplied by the value of token T1. In A3 there is a signed group multiplied by T2 and another by T1. Since all of the variables are either input sample numbers or tokens, this representation is called level zero.

Refer to A1 and A3 in Section 4 of Table 1. The groups of samples multiplied by T1 differ only in that the signs are all reversed. The same is true of B1 and B3 except that not even the signs are reversed. Although the individual samples are shown here, the significance of each summation is a single number. Later they are named C6 and C4 respectively. If the sum of [S1−S3−S5+S7] is 3.256, then it follows that A1=3.256*T2−G5 and that A3=−3.256*T2−G5. In other words, we may compute the value of a sum and store it. We can then attach the sign in each case. Once we form the equations for a set of N-coefficients and group sums and tokens, we may identify all groups that are identical (other than sign) independent of where we will use them. The minimum list of groups is one part of developing the required minimum structure. (See step 140).

The next step will be illustrated graphically, but would be the result of a program in a larger development. In Section 5, there are three levels of summation shown. The variables G1 through G4 each consist of two samples added. These tokens represent unique groups of samples that are multiplied by the first set of tokens T. G1 is the $(N/2)^{th}$ plus the $N^{th}$ sample. G2 is sum of the sample before and the sample after the $(N/2)^{th}$ sample. G3 is the sum of the two samples immediately outside those of G2. This continues until G(N/2) which is composed of samples S1 and S(N−1). G(N/2+1) has the same samples as G1 but the second is subtracted from the first. The other N/2−2 GXs are likewise subtractions and have the same members as G2 through G(N/2−1). The N variables, GX are level 1, each consisting of the sum or difference of two samples.

The level two CX variables are a third set of tokens that consist of the sum or difference of two level one GX variables. Three pairs are used to make the six CX variables, each are the sum or difference of two GX variables. Therefore, each arc sums of four samples and again are just one numerical value and a sign. (See step 150).

Level 3 DX variables are a fourth set of tokens that consist of the sum and difference of two CX variables. C1 and C2 are used to form D1 and D2. Therefore, these are each the summation of eight samples reduced to a single signed number. (See steps 160–180).

The method of forming the equations may not be optimized. It is possible to use a random matching procedure to find the simplest implementation of the required steps. Section 6 contains the same information as Section 4 except the formulas are expressed in variables that represent the actual sample combinations. These combinations are achieved purely by the addition of binary sample numbers in a pattern somewhat like the Butterfly method. It is worth mentioning that they are not identical to the Butterfly method.

Next, we observe that the value of T1 is one. Multiplying by one produces no change. In Section 7, the formulas are simplified by removing the (times T1) portion. A review of the final formulas shows that there are only four real multiplies to be made. On the other hand, two of these are C4*T2 with G7 added to or subtracted from it. The other two are C6*T2 with different signs and G5 subtracted. Therefore, only two multiplies are required to do an eight-sample (N=8) Fourier Transform (which is N/4), the FFT would use 24 which is N*Log(N).

It is necessary to point out that small Fourier Transforms have a higher percentage of 1's and therefore a greater reduction of multiplies. It is estimated that the actual number of multiplies approaches N as N increases. This is for N being a power of two. Results are not as efficient for other N's.

It is also worth noting that for larger N's the tokens include ½ and ¼. These can be achieved by summing in a bank of memory that includes a wired offset of one or two binary places as it connects to the output bus without multiplying. There are several ways to take advantage of these cases.

The method of defining level 1 terms seems to be optimal. Formation of the intermediate terms for each N may be accurately done by a 'modify and evaluate' program that has freedom to substitute equivalents and test the merit of each case. What is best is a matter of the design requirements and the technology being used. Given a well-chosen set of requirements it is reasonable to devote a sizeable effort to the solution because it is a one-time task. Extension of these principles to N=16, 32, and 64 are good steps in developing various 'rules' and insights for extending to larger N's with less reliance on the 'modify and evaluate' strategy. Once an approach is shown to find the simplest procedure it is possible to phrase various parallel approaches are simply variants of what is disclosed herein.

A further strategy that is useful when reducing the number of multiplications in a DFT that is composed of a large number of finite-precision samples is achieved by grouping the tokens. This is accomplished as shown in the following example.

An 8192 sample DFT is to be evaluated with samples that are eight-bit binary numbers. If it is decided to use trigonometric functions, rounded correctly to eight bits. The sixteen-bit products are summed in 32-bit registers. There are 2048 first-level tokens that represent the trigonometric function values. These values are rounded correctly to eight bits and assigned to 256 second-level tokens. All of the components of each coefficient that are multiplied by any of the 2048 first-level tokens that are now represented by a single second-level token are thus summed and handled in a single multiplication by the appropriate second-level token value.

This has the effect of reducing the number of multiplies and introducing a noise source. A noise source was already present due to quantization of the original samples to eight-bit accuracy. Matching it by eight-bit rounding of the multipliers will increase the noise by the square root of two. If the original noise source was acceptable in the application, general engineering practice considers that there will be no serious degradation due to the use of eight bit multipliers.

It therefore follows that it is possible to further group and sum according to the principles described above using the actual individual properties and bit-lengths that apply to each and every case. This is valuable where a specific case will be used many times such as in real-time processing, modulation or image compression to name a few applications.

A Computational Minimization of the Discrete Cosine Transform (DCT)

The DCT is also of interest for a variety of applications. Table 2 Sections 1 to 6 show that the calculation requirements for the Discrete Cosine Transform can be reduced according to embodiments of the present invention.

An example of a method according to one embodiment of the present invention will now be presented for the DCT. This example will show the case where N=8. As mentioned earlier, the procedures described here can be programmed so that it is possible to mechanically develop the equations for any given N.

Table 2 Section 1 shows the terms that define an 8 by 8 DCT. Applying essentially the same procedure described in the sequence presented above and illustrated in FIG. 1 provides a somewhat different solution as is seen in the listings in Table 2. Sections 1 to 6 essentially repeat the previous steps describe for the Fourier Transform in Table 1. Again, only a single multiply is required in calculating the coefficients.

Additional descriptions of embodiments of the present invention can be found in Tables 3–11. An embodiment of the present invention for a sixteen sample one-dimensional discrete cosine transform is presented in Table 3. The equations according to an embodiment of the present invention are presented in Table 4. The equations in Table 4 are derived for an eight sample Fourier transform. Table 4 also shows example calculations using those equations. It is to be understood that the equations, such as those shown in Table 4, comprise one embodiment of the present invention, particularly when used in the form of executable steps for processing on an information processors such as a computer. Table 4 clearly illustrates an important advantage of the present invention. Specifically, only two multiplication steps are required in order to calculate the Fourier transform coefficients for the eight input values used in the calculations. Table 5 shows calculation similar to those shown in Table 4 except that a different starting function is assumed from which coefficients are derived.

Table 6 shows an embodiment of the present invention for calculating two-dimensional discrete cosine transforms for eight set of eight samples. Table 7 also shows an embodiment of the present invention for the two-dimensional discrete cosine transform for 64 samples. However, the embodiment shown in Table 7 accomplishes the calculations as a single step special case process. Table 8 shows an embodiment of present invention for calculating discrete cosine transforms for eight samples.

Process Examples of Fourier Transform and Discrete Cosine Transform

A simulation program was developed to determine how much storage and the number of adds and multiplies that would be required to process the Fourier Transform (see: Table 9 Process Example of SFT) and the Discrete Cosine Transform (see: Table 10 Process Example of SDCT). Since there are eight samples and eight coefficients to be found we can rule out any number below eight. The simulation started with storage elements G1, G2, . . . G8. Each of the first four samples was loaded in two locations according to a map of what combinations were needed. The process went as follows: S1: G4, G6; S2: G3, G7; S3: G2, G8; S4: G1, G5. All eight storage element thus had information. The next three samples were then add-accumulated to the initial contents as follows: S5: G2, G8; S6: G3, G7; S7: G4, G6.

It is now optional to process or load the eighth sample. The process steps are done by putting the G2−G4 in a new storage element, TEMP, G2+G4 in G4, and then TEMP in G2. It is then possible to put G6+G8 in TEMP, G6−G8 in G6 and then TEMP in G8. B2 is now in G6.

The next step is to a multiply G8 times T2 (T2= 0.7071067812 . . . ) and place G8*T2 in TEMP. Then place TEMP−G7 in G8 and TEMP+G7 in G7. B1 is now in G7 and B3 is in G8. We therefore see that it is possible to compute all of the Bn after the (N−1) sample as they are independent of the $N^{th}$ sample.

The process has used 16 add-accumulate procedures and one multiply. A0 is now in G4, A2 is in G1 and A4 is in G3.

The other coefficient requires that G2 is multiplied by T2. First place G2*T2 in TEMP. Now place G5−TEMP in G2 and G5+TEMP in G5. Now A1 is in G2 and A3 is in G5.

The coefficients are complete and the entire process used a total of twenty add-accumulate procedures, two multiplications. The Butterfly method by comparison uses 24 multiply-add-accumulate procedures.

The total storage requirement is N+1 words. In a practical situation there is usually a requirement to be saving one sample set while processing the next. It follows that some amount of storage (up to N words) will be added to store the samples that would be received before the coefficients are transmitted.

Embodiments of the present invention are of value when the original program is dedicated to a specific purpose such as evaluating the actual values of functions at selected points of evaluation. Once this information is determined, the entire solution is formed with the real variables being unrestricted. The program is then structured for optimum behavior and made ready for the input values to be applied with no difference or controlled changes in the functional behavior. The process can improve the understandability of mathematical relationships and identify cases where variables change their effects.

In general, the process of generating coefficient from input values is parallel to the process of generating input values from coefficients. Therefore, the methods shown to do the former are equally methods to do the latter.

Tables 1–11 are method steps, tables, examples, and control flow illustrations of methods and program products according to the invention. It will be understood that each step, flowchart and control flow illustrations, and combinations thereof can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains, having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

TABLE 1

Example of steps for reducing the calculations for determining the Fourier Transform for eight samples according to one embodiment of the present invention.

| Co | Sampl 1 | Sampl 2 | Sampl 3 | Sampl 4 | Sampl 5 | Sampl 6 | Sampl 7 | Sampl 8 |
|---|---|---|---|---|---|---|---|---|
| Section 1 | | | | | | | | |
| A0 | cos(0) | cos(0) | cos(0) | cos(0) | cos(0) | cos(0) | cos(0) | cos(0) |
| A1 | cos(Pi/4) | cos(Pi/2) | cos(Pi * 3/4) | cos(Pi) | cos(Pi * 5/4) | cos(Pi * 3/2) | cos(Pi * 7/4) | cos(2 * Pi) |
| A2 | cos(Pi/2) | cos(Pi) | cos(Pi * 3/2) | cos(2 * Pi) | cos(Pi * 5/2) | cos(Pi * 6/2) | cos(Pi * 7/2) | cos(4 * Pi) |
| A3 | cos(Pi * 3/4) | cos(Pi * 3/2) | cos(Pi * 9/4) | cos(3 * Pi) | cos(Pi * 15/4) | cos(Pi * 9/2) | cos(Pi * 21/4) | cos(6 * Pi) |
| A4 | cos(Pi) | cos(2 * Pi) | cos(3 * Pi) | cos(4 * Pi) | cos(5 * Pi) | cos(6 * Pi) | cos(7 * Pi) | cos(8 * Pi) |
| B1 | sin(Pi/4) | sin(Pi/2) | sin(Pi * 3/4) | sin(Pi) | sin(Pi * 5/4) | sin(Pi * 3/2) | sin(Pi * 7/4) | sin(2 * Pi) |
| B2 | sin(Pi/2) | sin(Pi) | sin(Pi * 3/2) | sin(2 * Pi) | sin(Pi * 5/2) | sin(Pi * 6/2) | sin(Pi * 7/2) | sin(4 * Pi) |
| B3 | sin(Pi * 3/4) | sin(Pi * 3/2) | sin(Pi * 9/4) | sin(3 * Pi) | sin(Pi * 15/4) | sin(Pi * 9/2) | sin(Pi * 21/4) | sin(6 * Pi) |
| Section 2 | | | | | | | | |
| A0 | +1 | +1 | +1 | +1 | +1 | +1 | +1 | +1 |
| A1 | +0.707107 | 0 | −0.707107 | −1 | −0.707107 | 0 | +0.707107 | +1 |
| A2 | 0 | −1 | 0 | +1 | 0 | −1 | 0 | +1 |
| A3 | −0.707107 | 0 | +0.707107 | −1 | +0.707107 | 0 | −0.707107 | +1 |
| A4 | −1 | +1 | −1 | +1 | −1 | +1 | −1 | +1 |
| B1 | +0.707107 | +1 | +0.707107 | 0 | −0.707107 | −1 | −0.707107 | 0 |
| B2 | +1 | 0 | −1 | 0 | +1 | 0 | −1 | 0 |
| B3 | +0.707107 | −1 | +0.707107 | 0 | −0.707107 | 1 | −0.707107 | 0 |
| Section 3 | | | | | | | | |
| A0 | T1 | T1 | T1 | T1 | T1 | T1 | T1 | T1 |
| A1 | T2 | 0 | −T2 | −T1 | −T2 | 0 | T2 | T1 |
| A2 | 0 | −T1 | 0 | T1 | 0 | −T1 | 0 | T1 |
| A3 | −T2 | 0 | T2 | −T1 | T2 | 0 | −T2 | T1 |
| A4 | −T1 | T1 | −T1 | T1 | −T1 | T1 | −T1 | T1 |
| B1 | T2 | T1 | T2 | 0 | −T2 | −T1 | −T2 | 0 |
| B2 | T1 | 0 | −T1 | 0 | T1 | 0 | −T1 | 0 |
| B3 | T2 | −T1 | T2 | 0 | −T2 | T1 | −T2 | 0 |

| STATUS | Name | Formula | S1 | S2 | S3 | S4 | S5 | S6 | S7 | S8 | NOTES |
|---|---|---|---|---|---|---|---|---|---|---|---|
| Section 4 | | | | | | | | | | | |
| Level 0 | A0 | [S1 + S2 + S3 + S4 + S5 + S6 + S7 + S8] * T1 | T1 | T1 | T1 | T1 | T1 | T1 | T1 | T1 | |
| Level 0 | A1 | [S1 − S3 − S5 + S7] * T2 + [−S4 + S8] * T1 | T2 | 0 | −T2 | −T1 | −T2 | 0 | T2 | T1 | |
| Level 0 | A2 | [−S2 + S4 − S6 + S8 ] * T1 | 0 | −T1 | 0 | T1 | 0 | −T1 | 0 | T1 | |
| Level 0 | A3 | [−S1 + S3 + S5 − S7] * T2 + [−S4 + S8 ] * T1 | −T2 | 0 | T2 | −T1 | T2 | 0 | −T2 | T1 | |
| Level 0 | A4 | [−S1 + S2 − S3 + S4 − S5 + S6 − S7 + S8] * T1 | −T1 | T1 | −T1 | T1 | −T1 | T1 | −T1 | T1 | |
| Level 0 | B1 | [S1 + S3 − S5 − S7] * T2 + [S2 − S6] * T1 | T2 | T1 | T2 | 0 | −T2 | −T1 | −T2 | 0 | ** |
| Level 0 | B2 | [S1 − S3 + S5 − S7] * T1 | T1 | 0 | −T1 | 0 | T1 | 0 | −T1 | 0 | ** |
| Level 0 | B3 | [S1 + S3 − S5 − S7 ]* T2 + [−S2 + S6] * T1 | T2 | −T1 | T2 | 0 | −T2 | T1 | −T2 | 0 | ** |
| Section 5 | | | | | | | | | | | |
| Level 1 | G1 | S4 + S8 | | | | + | | | | + | |
| Level 1 | G2 | S3 + S5 | | | + | | + | | | | |
| Level 1 | G3 | S2 + S6 | | + | | | | + | | | |
| Level 1 | G4 | S1 + S7 | + | | | | | | + | | |
| Level 1 | G5 | S4 − S8 | | | | + | | | | − | *** |
| Level 1 | G6 | S1 − S7 | + | | | | | | − | | |
| Level 1 | G7 | S2 − S6 | | + | | | | − | | | *** |
| Level 1 | G8 | S3 − S5 | | | + | | − | | | | |
| Level 2 | C1 | G1 + G3 | | + | | + | | + | | + | |
| Level 2 | C2 | G2 + G4 | + | | + | | + | | + | | |
| Level 2 | C3 | G6 − G8 | + | | − | | + | | − | | *** |
| Level 2 | C4 | G6 + G8 | + | | + | | − | | − | | *** |
| Level 2 | C5 | G1 − G3 | | − | | + | | − | | + | *** |
| Level 2 | C6 | G2 − G4 | − | | + | | + | | − | | *** |
| Level 3 | D1 | C1 + C2 | + | + | + | + | + | + | + | + | *** |
| Level 3 | D2 | C1 − C2 | − | + | − | + | − | + | − | + | *** |
| Section 6 | | | | | | | | | | | |
| simplified | A0 | D1 * T1 | T1 | T1 | T1 | T1 | T1 | T1 | T1 | T1 | |
| simplified | A1 | −C6 * T2 − G5 * T1 | T2 | 0 | −T2 | −T1 | −T2 | 0 | T2 | T1 | |
| simplified | A2 | C5 * T1 | 0 | −T1 | 0 | T1 | 0 | −T1 | 0 | T1 | |
| simplified | A3 | C6 * T2 − G5 * T1 | −T2 | 0 | T2 | −T1 | T2 | 0 | −T2 | T1 | |
| simplified | A4 | D2 * T1 | −T1 | T1 | −T1 | T1 | −T1 | T1 | −T1 | T1 | |
| simplified | B1 | C4 * T2 + G7 * T1 | T2 | T1 | T2 | 0 | −T2 | −T1 | −T2 | 0 | ** |
| simplified | B2 | C3 * T1 | T1 | 0 | −T1 | 0 | T1 | 0 | −T1 | 0 | ** |
| simplified | B3 | C4 * T2 − G7 * T1 | T2 | −T1 | T2 | 0 | −T2 | T1 | −T2 | 0 | ** |
| Section 7 | | | | | | | | | | | |
| Final | A0 | D1 | 1 | 1 | 1 | 1 | 1 | 1 | 1 | 1 | |
| Final | A1 | −C6 * T2 − G5 | T2 | 0 | −T2 | −1 | −T2 | 0 | T2 | 1 | |
| Final | A2 | C5 | 0 | −1 | 0 | 1 | 0 | −1 | 0 | 1 | |
| Final | A3 | C6 * T2 − G5 | −T2 | 0 | T2 | −1 | T2 | 0 | −T2 | 1 | |
| Final | A4 | D2 | −1 | 1 | −1 | 1 | −1 | 1 | −1 | 1 | |
| Final | B1 | C4 * T2 + G7 | T2 | 1 | T2 | 0 | −T2 | −1 | −T2 | 0 | ** |
| Final | B2 | C3 | 1 | 0 | −1 | 0 | 1 | 0 | −1 | 0 | ** |
| Final | B3 | C4 * T2 − G7 | T2 | −1 | T2 | 0 | −T2 | 1 | −T2 | 0 | ** |

** = Complete on arrival of the $(N − 1)^{th}$ sample.
*** = Term is used in the final Formula set.

TABLE 2

Example of steps for reducing the calculations for determining the Discrete Cosine Transform for 8 samples according to one embodiment of the present invention. It is known that symmetries in the DCT lead to a number of identical coefficients due to the use of the cosine function (cos(a) = cos(2 Pi − a)). The table below illustrates the full description for completeness, yet in actual computations the symmetry leads to the facts that A7 = A1, A6 = A2, A5 = A3).

| Co | Sampl 1 | Sampl 2 | Sampl 3 | Sampl 4 | Sampl 5 | Sampl 6 | Sampl 7 | Sampl 8 |
|---|---|---|---|---|---|---|---|---|
| Section 1 | | | | | | | | |
| A0 | cos(0) | cos(0) | cos(0) | cos(0) | cos(0) | cos(0) | cos(0) | cos(0) |
| A1 | cos(Pi/4) | cos(Pi/2) | cos(3 * Pi/4) | cos(Pi) | cos(5 * Pi/4) | cos(3 * Pi/2) | cos(7 * Pi/4) | cos(2 * Pi) |
| A2 | cos(Pi/2) | cos(Pi) | cos(3 * Pi/2) | cos(2 * Pi) | cos(5 * Pi/2) | cos(6 * Pi/2) | cos(7 * Pi/2) | cos(4 * Pi) |
| A3 | cos(3 * Pi/4) | cos(3 * Pi/2) | cos(9 * Pi/4) | cos(3 * Pi) | cos(15 * Pi/4) | cos(9 * Pi/2) | cos(21 * Pi/4) | cos(6 * Pi) |
| A4 | cos(Pi) | cos(2 * Pi) | cos(3 * Pi) | cos(4 * Pi) | cos(5 * Pi) | cos(6 * Pi) | cos(7 * Pi) | cos(8 * Pi) |
| A5 | cos(5 * Pi/4) | cos(5 * Pi/2) | cos(15 * Pi/4) | cos(5 * P) | cos(25 * Pi/4) | cos(15 * Pi/2) | cos(35 * Pi/4) | cos(10 * Pi) |
| A6 | cos(3 * Pi/2) | cos(3 * Pi) | cos(9 * Pi/2) | cos(6 * Pi) | cos(15 * Pi/2) | cos(9 * Pi) | cos(21 * Pi/2) | cos(12 * Pi) |
| A7 | cos(7 * Pi/4) | cos(7 * Pi/2) | cos(21 * Pi/4) | cos(7 * Pi) | cos(35 * Pi/4) | cos(21 * Pi/2) | cos(49 * Pi/4) | cos(14 * Pi) |

TABLE 2-continued

Example of steps for reducing the calculations for determining the Discrete Cosine
Transform for 8 samples according to one embodiment of the present invention. It is known
that symmetries in the DCT lead to a number of identical coefficients due to the use of
the cosine function (cos(a) = cos(2 Pi − a)). The table below illustrates the
full description for completeness, yet in actual computations the symmetry leads to the
facts that A7 = A1, A6 = A2, A5 = A3).

| Co | Sampl 1 | Sampl 2 | Sampl 3 | Sampl 4 | Sampl 5 | Sampl 6 | Sampl 7 | Sampl 8 |
|---|---|---|---|---|---|---|---|---|
| Section 2 | | | | | | | | |
| A0 | +1 | +1 | +1 | +1 | +1 | +1 | +1 | +1 |
| A1 | +0.707107 | 0 | −0.707107 | −1 | −0.707107 | 0 | +0.707107 | +1 |
| A2 | 0 | −1 | 0 | +1 | 0 | −1 | 0 | +1 |
| A3 | −0.707107 | 0 | +0.707107 | −1 | +0.707107 | 0 | −0.707107 | +1 |
| A4 | −1 | +1 | −1 | +1 | −1 | +1 | −1 | +1 |
| A5 | −0.707107 | 0 | +0.707107 | −1 | +0.707107 | 0 | −0.707107 | −1 |
| A6 | 0 | −1 | 0 | +1 | 0 | −1 | 0 | +1 |
| A7 | +0.707107 | 0 | −0.707107 | − | −0.707107 | 0 | +0.707107 | +1 |
| Section 3 | | | | | | | | |
| A0 | T1 | T1 | T1 | T1 | T1 | T1 | T1 | T1 |
| A1 | T2 | 0 | −T2 | −T1 | −T2 | 0 | T2 | T1 |
| A2 | 0 | −T1 | 0 | T1 | 0 | −T1 | 0 | T1 |
| A3 | −T2 | 0 | T2 | −T1 | T2 | 0 | −T2 | T1 |
| A4 | −T1 | T1 | −T1 | T1 | −T1 | T1 | −T1 | T1 |
| A5 | −T2 | 0 | T2 | −T1 | T2 | 0 | −T2 | T1 |
| A6 | 0 | −T1 | 0 | T1 | 0 | −T1 | 0 | T1 |
| A7 | T2 | 0 | −T2 | −T1 | −T2 | 0 | T2 | T1 |

| Raw Formula | Name | USE | S1 | S2 | S3 | S4 | S5 | S6 | S7 | S8 | FINAL |
|---|---|---|---|---|---|---|---|---|---|---|---|
| Section 4 | | | | | | | | | | | |
| [S1 + S2 + S3 + S4 + S5 + S6 + S7 + S8] * T1 | A0 | Coef. | T1 | T1 | T1 | T1 | T1 | T1 | T1 | T1 | |
| [S1 − S3 − S5 + S7] * T2 + [−S4 + S8]T1 | A1 | Coef. | T2 | 0 | −T2 | −T1 | −T2 | 0 | T2 | T1 | |
| [−S2 + S4 − S6 + S8] * T1 | A2 | Coef. | 0 | −T1 | 0 | T1 | 0 | −T1 | 0 | T1 | |
| [−S1 + S3 + S5 − S7] * T2 + [−S4 + S8] * T1 | A3 | Coef. | −T2 | 0 | T2 | −T1 | T2 | 0 | −T2 | T1 | |
| [−S1 + S2 − S3 + S4 − S5 + S6 − S7 + S8] * T1 | A4 | Coef. | −T1 | T1 | −T1 | T1 | −T1 | T1 | −T1 | T1 | |
| [−S1 + S3 + S5 − S7] * T2 + [−S4 + S8 ]T1 | A5 | Coef. | −T2 | 0 | T2 | −T1 | T2 | 0 | −T2 | T1 | |
| [−S2 + S4 − S6 + S8] * T1 | A6 | Coef. | 0 | −T1 | 0 | T1 | 0 | −T1 | 0 | T1 | |
| [S1 − S3 − S5 + S7] * T2 + [−S4 + S8] * T1 | A7 | Coef. | T2 | 0 | −T2 | −T1 | −T2 | 0 | T2 | T1 | |
| Section 5 | | | | | | | | | | | |
| S4 + S8 | G1 | Level 1 | | | | + | | | | + | |
| S3 + S5 | G2 | Level 1 | | | + | | + | | | | |
| S2 + S6 | G3 | Level 1 | | + | | | | + | | | |
| S1 + S7 | G4 | Level 1 | + | | | | | | + | | |
| S4 − S8 | G5 | Level 1 | | | | + | | | | − | G5 |
| G1 + G3 | C1 | Level 2 | | + | | + | | + | | + | |
| G2 + G4 | C2 | Level 2 | + | | + | | + | | + | | |
| G1 − G3 | C5 | Level 2 | | − | | + | | − | | + | C5 |
| G2 − G4 | C6 | Level 2 | − | | + | | + | | − | | C6 |
| C1 + C2 | D1 | Level 3 | + | + | + | + | + | + | + | + | D1 |
| C1 − C2 | D2 | Level 3 | − | + | − | + | − | + | − | + | D2 |
| Section 6 (T1 = 1, T2 = 0.707107 ... ) | | | | | | | | | | | |
| D1 | A0 | | +1 | +1 | +1 | +1 | +1 | +1 | +1 | +1 | |
| −C6 * T2 − G5 | A1 | | +.7 | | −.7 | −1 | −.7 | | +.7 | +1 | |
| C5 | A2 | | | −1 | | +1 | | −1 | | +1 | |
| C6 * T2 − G5 | A3 | | −.7 | | +.7 | −1 | +.7 | | −.7 | +1 | |
| D2 | A4 | | −1 | +1 | −1 | +1 | −1 | +1 | −1 | +1 | |
| C6 * T2 − G5 | A5 | | −.7 | | +.7 | −1 | +.7 | | −.7 | +1 | |
| C5 | A6 | | | −1 | | +1 | | −1 | | +1 | |
| −C6 * T2 − G5 | A7 | | +.7 | | −.7 | −1 | −.7 | | +.7 | +1 | |

TABLE 3

Example of steps for reducing the calculations for determining the One Dimentional Discrete CosineTransform for 16 samples according to one embodiment of the present invention

| Co | Formula | T2A | T2B | T2C | T2D | T3A | T3B | T3C | T3D | T4A | T4B | T4C | T4D | T5A | T5B | T5C | T5D |
|---|---|---|---|---|---|---|---|---|---|---|---|---|---|---|---|---|---|
| A1 | S1 + S15 | | | | | | | | | | | | | | | | |
| A2 | S2 + S14 | | | | | | | | | | | | | | | | |
| A3 | S3 + S13 | | | | | | | | | | | | | | | | |
| A4 | S4 + S12 | | | | | | | | | | | | | | | | |
| A5 | S5 + S11 | | | | | | | | | | | | | | | | |
| A6 | S6 + S10 | | | | | | | | | | | | | | | | |
| A7 | S7 + S9 | | | | | | | | | | | | | | | | |
| A8 | S8 + S16 | | | | | | | | | | | | | | | | |
| A9 | S8 − S16 | | | | | | | | | | | | | | | | |
| B1 | A1 + A7 | | | | | | | | | | | | | | | | |
| B2 | A2 + A6 | | | | | | | | | | | | | | | | |
| B3 | A3 + A5 | | | | | | | | | | | | | | | | |
| B4 | A4 + A8 | | | | | | | | | | | | | | | | |
| B5 | A1 − A7 | | | | | | | | | | | | | | | | |
| B6 | A2 − A6 | | | | | | | | | | | | | | | | |
| B7 | A3 − A5 | | | | | | | | | | | | | | | | |
| B8 | A4 − A8 | | | | | | | | | | | | | | | | |
| C1 | B1 + B3 | | | | | | | | | | | | | | | | |
| C2 | B2 + B4 | | | | | | | | | | | | | | | | |
| C3 | B1 − B3 | | | | | | | | | | | | | | | | |
| C4 | B2 − B4 | | | | | | | | | | | | | | | | |
| D1 | C1 + C2 | | | | | | | | | | | | | | | | |
| D2 | C1 − C2 | | | | | | | | | | | | | | | | |
| T1 | 0 | | | | | | | | | | | | | | | | |
| T2 | 1 | | | | | | | | | | | | | | | | |
| T3 | 0.9238795325 | | | | | | | | | | | | | | | | |
| T4 | 0.7071067814 | | | | | | | | | | | | | | | | |
| T5 | 0.3826834324 | | | | | | | | | | | | | | | | |
| M1 | B5 * T3 | | | | | | | | | | | | | | | | |
| M2 | B5 * T5 | | | | | | | | | | | | | | | | |
| M3 | B7 * T3 | | | | | | | | | | | | | | | | |
| M4 | B7 * T5 | | | | | | | | | | | | | | | | |
| M5 | B6 * T4 | | | | | | | | | | | | | | | | |
| M6 | C3 * T4 | | | | | | | | | | | | | | | | |
| E1 | −A9 + M5 | | | | | | | | | | | | | | | | |
| E2 | −A9 − M5 | | | | | | | | | | | | | | | | |
| E3 | M1 + M4 | | | | | | | | | | | | | | | | |
| E4 | M2 − M3 | | | | | | | | | | | | | | | | |
| E5 | −M6 − B8 | | | | | | | | | | | | | | | | |
| E6 | M6 − B8 | | | | | | | | | | | | | | | | |
| Co1 | D1 | | | | | D1 | | | | | | | | | | | |
| Co2 | E1 + E3 | −A9 | | | | | M1 | | | | M5 | | | | | M4 | |
| Co3 | E5 | | −B8 | | | | | | | | | −M6 | | | | | |
| Co4 | E2 + E4 | −A9 | | | | | −M3 | | | | −M5 | | | | | M2 | |
| Co5 | −C4 | | | −C4 | | | | | | | | | | | | | |
| Co6 | E2 − E4 | −A9 | | | | | M3 | | | | −M5 | | | | | −M2 | |
| Co7 | E6 | | −B8 | | | | | | | | | M6 | | | | | |
| Co15 | E5 | | −B8 | | | | | | | | | −M6 | | | | | |
| Co16 | E1 + E3 | −A9 | | | | | M1 | | | | M5 | | | | | M4 | |
| Co8 | E1 − E3 | −A9 | | | | | −M1 | | | | M5 | | | | | −M4 | |
| Co9 | −D2 | | | | −D2 | | | | | | | | | | | | |
| Co10 | E1 − E3 | −A9 | | | | | −M1 | | | | M5 | | | | | −M4 | |
| Co11 | E6 | | −B8 | | | | | | | | | M6 | | | | | |
| Co12 | E2 − E4 | −A9 | | | | | M3 | | | | −M5 | | | | | −M2 | |
| Co13 | −C4 | | | −C4 | | | | | | | | | | | | | |
| Co14 | E2 + E4 | −A9 | | | | | −M3 | | | | −M5 | | | | | M2 | |

TABLE 4

Example calculations of Fourier Transform for eight
samples according to one embodiment of the present invention
Super Fast Fourier Transform Let x range from 1/8 to 1 in 8 steps. Let F(x) be sampled at the eight points.

$x := .125, .250 \ldots 1 \quad F(x) := \sin(3 \cdot 2 \cdot \pi \cdot x) \quad x = \quad F(x) =$

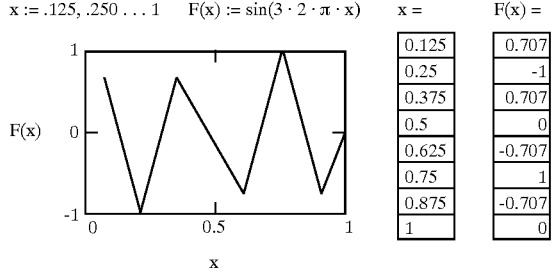

| x | F(x) |
|---|---|
| 0.125 | 0.707 |
| 0.25 | -1 |
| 0.375 | 0.707 |
| 0.5 | 0 |
| 0.625 | -0.707 |
| 0.75 | 1 |
| 0.875 | -0.707 |
| 1 | 0 |

S1 := F(.125)  S2 := F(.250)  S3 := F(.375)  S4 := F(.5)
S5 := F(.625)  S6 := F(.75)   S7 := F(.875)  S8 := F(1)

$T2 := \sin\left(\dfrac{\pi}{4}\right)$

M1 := (S1 − S3 − S5 + S7) · T2      Multiply #1
M2 := (S1 + S3 − S5 − S7) · T2      Multiply #2

A0 := (S1 + S2 + S3 + S4 + S5 + S6 + S7 + S8) · T2    $\dfrac{A0}{2} = 0$

A1 := M1 − S4 + S8           A1 = 0
A2 := (−S2 + S4 − S6 + S8)   A2 = 0
A3 := −M1 − S4 + S8          A3 = 0

A4 := −S1 + S2 − S3 + S4 − S5 + S6 − S7 + S8    $\dfrac{A4}{2} = 0$

B1 := M2 + S2 − S6     B1 = 0
B2 := S1 − S3 + S5 − S7    B2 = 0
B3 := M2 − S2 + S6     B3 = 4

$FT := \begin{bmatrix} A1 & A2 & A3 & \dfrac{A4}{2} \\ B1 & B2 & B3 & \dfrac{A0}{2} \end{bmatrix} \quad FT = \begin{bmatrix} 0 & 0 & 0 & 0 \\ 0 & 0 & 4 & 0 \end{bmatrix}$

TABLE 5

Example calculations of Fourier Transform for eight
samples according to one embodiment of the present invention
Super Fast Fourier Transform Let x range from 1/8 to 1 in 8 steps. Let F(x) be sampled at the eight points.

$x := .125, .250 \ldots 1 \quad F(x) := \cos(0 \cdot 2 \cdot \pi \cdot x) \quad x = \quad F(x) =$

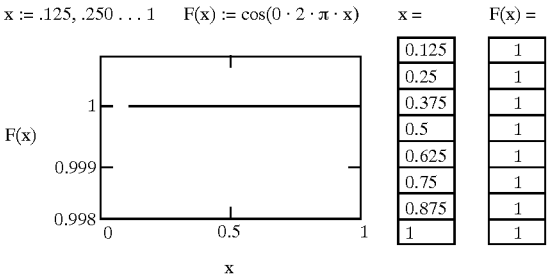

| x | F(x) |
|---|---|
| 0.125 | 1 |
| 0.25 | 1 |
| 0.375 | 1 |
| 0.5 | 1 |
| 0.625 | 1 |
| 0.75 | 1 |
| 0.875 | 1 |
| 1 | 1 |

S1 := F(.125)  S2 := F(.250)  S3 := F(.375)  S4 := F(.5)
S5 := F(.625)  S6 := F(.75)   S7 := F(.875)  S8 := F(1)

$T2 := \sin\left(\dfrac{\pi}{4}\right)$

M1 := (S1 − S3 − S5 + S7) · T2      Multiply #1
M2 := (S1 + S3 − S5 − S7) · T2      Multiply #2

A0 := (S1 + S2 + S3 + S4 + S5 + S6 + S7 + S8)    $\dfrac{A0}{2} = 0$

A1 := M1 − S4 + S8           A1 = 0
A2 := (−S2 + S4 − S6 + S8)   A2 = 0
A3 := −M1 − S4 + S8          A3 = 0

A4 := −S1 + S2 − S3 + S4 − S5 + S6 − S7 + S8    $\dfrac{A4}{2} = 0$

B1 :1= M2 + S2 − S6     B1 = 0
B2 :1= S1 − S3 + S5 − S7    B2 = 0
B3 :1= M2 − S2 + S6     B3 = 0

$FT := \begin{bmatrix} A1 & A2 & A3 & \dfrac{A4}{2} \\ B1 & B2 & B3 & \dfrac{A0}{2} \end{bmatrix} \quad FT = \begin{bmatrix} 0 & 0 & 0 & 0 \\ 0 & 0 & 0 & 4 \end{bmatrix}$

TABLE 6

Example calculations of 2-Dimension Discrete Cosine Transform for eight samples
sets of eight according to one embodiment of the present invention.
Super Fast 2-Dimension Discrete Cosine Transform Let F(x, y) be any real single-valued function. [S] will form an 8 × 8 matrix which will then used as input. The values
thus obtained are displayed below and to the right of the initial equations. Eight sets of eight coefficients
are evaluated as [A] . After [A] is formed, the process is repeated sideways
to form the two-dimension discrete cosine transform. One multiply is required for each
eight sample, one dimension transform. A total of sixteen multiplies is therefore necessary to complete the process.

$F(x, y) := \cos(2 \cdot \pi \cdot 4y) + \dfrac{x}{3} - \dfrac{y}{5} \quad T1 := 1 \quad T2 := 0.7071067812$

TABLE 6-continued

Example calculations of 2-Dimension Discrete Cosine Transform for eight samples
sets of eight according to one embodiment of the present invention.
Super Fast 2-Dimension Discrete Cosine Transform $$S := \begin{pmatrix} F(.125,.125) & F(.25,.125) & F(.375,.125) & F(.5,.125) & F(.625,.125) & F(.75,.125) & F(.875,.125) & F(1,.125) \\ F(.125,.250) & F(.25,.250) & F(.375,.250) & F(.5,.250) & F(.625,.250) & F(.75,.250) & F(.875,.250) & F(1,.250) \\ F(.125,.375) & F(.25,.375) & F(.375,.375) & F(.5,.375) & F(.625,.375) & F(.75,.375) & F(.875,.375) & F(1,.375) \\ F(.125,.5) & F(.25,.5) & F(.375,.5) & F(.5,.5) & F(.625,.5) & F(.75,.5) & F(.875,.5) & F(1,.5) \\ F(.125,.625) & F(.25,.625) & F(.375,.625) & F(.5,.625) & F(.625,.625) & F(.75,.625) & F(.875,.625) & F(1,.625) \\ F(.125,.75) & F(.25,.75) & F(.375,.75) & F(.5,.75) & F(.625,.75) & F(.75,.75) & F(.875,.75) & F(1,.75) \\ F(.125,.875) & F(.25,.875) & F(.375,.875) & F(.5,.875) & F(.625,.875) & F(.75,.875) & F(.875,.875) & F(1,.875) \\ F(.125,1) & F(.25,1) & F(.375,1) & F(.5,1) & F(.625,1) & F(.75,1) & F(.875,1) & F(1,1) \end{pmatrix}$$

$$S = \begin{pmatrix} -0.983 & -0.942 & -0.9 & -0.858 & -0.817 & -0.775 & -0.733 & -0.692 \\ 0.992 & 1.033 & 1.075 & 1.117 & 1.158 & 1.2 & 1.242 & 1.283 \\ -1.033 & -0.992 & -0.95 & -0.908 & -0.867 & -0.825 & -0.783 & -0.742 \\ 0.942 & 0.983 & 1.025 & 1.067 & 1.108 & 1.15 & 1.192 & 1.233 \\ -1.083 & -1.042 & -1 & -0.958 & -0.917 & -0.875 & -0.833 & -0.792 \\ 0.892 & 0.933 & 0.975 & 1.017 & 1.058 & 1.1 & 1.142 & 1.183 \\ -1.133 & -1.092 & -1.05 & -1.008 & -0.967 & -0.925 & -0.883 & -0.842 \\ 0.842 & 0.883 & 0.925 & 0.967 & 1.008 & 1.05 & 1.092 & 1.133 \end{pmatrix}$$

```
G10 := S_{0,3} + S_{0,7}          G20 := S_{0,2} + S_{0,4}          G30 := S_{0,1} + S_{0,5}          G40 := S_{0,0} + S_{0,6}
G50 := S_{0,3} - S_{0,7}          G10 := G10 + G30                  G20 := G20 + G40                  G50 := G10 - G30
G60 := G20 - G40                  D10 := C10 + C20                  D20 := G10 - G20
G11 := S_{1,3} + S_{1,7}          G21 := S_{1,2} + S_{1,4}          G31 := S_{1,1} + S_{1,5}          G41 := S_{1,0} + S_{1,6}
G51 := S_{1,3} - S_{1,7}          G11 := G11 + G31                  G21 := G21 + G41                  G51 := G11 - G31
G61 := G21 - G41                  D11 := C11 + C21                  D21 := G11 - G21
G12 := S_{2,3} + S_{2,7}          G22 := S_{2,2} + S_{2,4}          G32 := S_{2,1} + S_{2,5}          G42 := S_{2,0} + S_{2,6}
G52 := S_{2,3} - S_{2,7}          G12 := G12 + G32                  G22 := G22 + G42                  G52 := G12 - G32
G62 := G22 - G42                  D12 := C12 + C22                  D22 := G12 - G22
G13 := S_{3,3} + S_{3,7}          G33 := S_{3,1} + S_{3,5}          G53 := S_{3,3} - S_{3,7}
G23 := S_{3,2} + S_{3,4}          G43 := S_{3,0} + S_{3,6}          C13 := G13 + G33
C23 := G23 + G43          C53 := G13 - G33          C63 := G23 - G43          D13 := C13 + C23          D23 := C13 - C23
G14 := S_{4,3} + S_{4,7}                                    G34 := S_{4,1} + S_{4,5}                                    G54 := S_{4,3} - S_{4,7}
G24 := S_{4,2} + S_{4,4}                                    G44 := S_{4,0} + S_{4,6}                                    C14 := G14 + G34
C24 := G24 + G44          C54 := G14 - G34          C64 := G24 - G44          D14 := C14 + C24          D24 := C14 - C24
G15 := S_{5,3} + S_{5,7}                                    G35 := S_{5,1} + S_{5,5}                                    G55 := S_{5,3} - S_{5,7}
G25 := S_{5,2} + S_{5,4}                                    G45 := S_{5,0} + S_{5,6}                                    C15 := G15 + G35
C25 := G25 + G45          C55 := G15 - G35          C65 := G25 - G45          D15 := C15 + C25          D25 := C15 - C25
G16 := S_{6,3} + S_{6,7}                                    G36 := S_{6,1} + S_{6,5}                                    G56 := S_{6,3} - S_{6,7}
G26 := S_{6,2} + S_{6,4}                                    G46 := S_{6,0} + S_{6,6}                                    C16 := G16 + G36
C26 := G26 + G46          C56 := G16 - G36          C66 := G26 - G46          D16 := C16 + C26          D26 := C16 - C26
G17 := S_{7,3} + S_{7,7}                                    G37 := S_{7,1} + S_{7,5}                                    G57 := S_{7,3} - S_{7,7}
G27 := S_{7,2} + S_{7,4}                                    G47 := S_{7,0} + S_{7,6}                                    C17 := G17 + G37
C27 := G27 + G47          C57 := G17 - G37          C67 := G27 - G47          D17 := C17 + C27          D27 := C17 - C27
M0 := C60 · T2            M1 := C61 · T2            M2 := C62 · T2            M3 := C63 · T2
A00 := D10                A10 := D11                A20 := D12                A30 := D13
A01 := -M0 - G50          A11 := -M1 - G51          A21 := -M2 - G52          A31 := -M3 - G53
A02 := C50                A12 := C51                A22 := C52                A32 := C53
A03 := M0 - G50           A13 := M1 - G51           A23 := M2 - G52           A33 := M3 - G53
A04 := D20                A14 := D21                A24 := D22                A34 := D23
A05 := M0 - G50           A15 := M1 - G51           A25 := M2 - G52           A35 := M3 - G53
A06 := C50                A16 := C51                A26 := C52                A36 := C53
A07 := M0 - G50           A17 := M1 - G51           A27 := M2 - G52           A37 := M3 - G53
M4 := C64 · T2            M5 := C65 · T2            M6 := C66 · T2            M7 := C67 · T2
A40 := D14                A50 := D15                A60 := D16                A70 := D17
A41 := -M4 - G54          A51 := -M5 - G55          A61 := -M6 - G56          A71 := -M7 - G57
A42 := C54                A52 := C55                A62 := C62                A72 := C57
A43 := M4 - G54           A53 := M5 - G55           A63 := M6 - G56           A73 := M7 - G57
A44 := D24                A54 := D25                A64 := D26                A74 := D27
A45 := M4 - G54           A55 := M5 - G55           A65 := M6 - G56           A75 := M7 - G57
A46 := C50                A56 := C55                A66 := C56                A76 := C57
A47 := M4 - G54           A57 := M5 - G55           A67 := M6 - G56           A77 := M7 - G57
A00 = -6.7    A10 = 9.1      A20 = -7.1    A30 = 8.7     A40 = -7.5    A50 = 8.3     A60 = -7.9    A70 = 7.9
A01 = 0.167   A11 = 0.167    A21 = 0.167   A31 = 0.167   A41 = 0.167   A51 = 0.167   A61 = 0.167   A71 = 0.167
A02 = 0.167   A12 = 0.167    A22 = 0.167   A32 = 0.167   A42 = 0.167   A52 = 0.167   A62 = 0.167   A72 = 0.167
A03 = 0.167   A13 = 0.167    A23 = 0.167   A33 = 0.167   A43 = 0.167   A53 = 0.167   A63 = 0.167   A73 = 0.167
A04 = 0.167   A14 = 0.167    A24 = 0.167   A34 = 0.167   A44 = 0.167   A54 = 0.167   A64 = 0.167   A74 = 0.167
A05 = 0.167   A15 = 0.167    A25 = 0.167   A35 = 0.167   A45 = 0.167   A55 = 0.167   A65 = 0.167   A75 = 0.167
A06 = 0.167   A16 = 0.167    A26 = 0.167   A36 = 0.167   A46 = 0.167   A56 = 0.167   A66 = 0.167   A76 = 0.167
```

TABLE 6-continued

Example calculations of 2-Dimension Discrete Cosine Transform for eight samples
sets of eight according to one embodiment of the present invention.
Super Fast 2-Dimension Discrete Cosine Transform

| | | | | |
|---|---|---|---|---|
| A07 = 0.167  A17 = 0.167 | A27 = 0.167 | A37 = 0.167  A47 = 0.167 | A57 = 0.167 | A67 = 0.167  A77 = 0.167 |
| G102 := A30 + A70 | | G302 := A10 + A50 | | G502 := A30 − A70 |
| G202 := A20 + A40 | | G402 := A00 + A60 | | C102 := G102 + G302 |
| G202 := G202 + G402 | G502 := G102 − G302 | G602 := G202 − G402 | D102 := C102 + C202 | D202 := C102 − C202 |
| G112 := A31 + A71 | | G312 := A11 + A51 | | G512 := A31 − A71 |
| G212 := A21 + A41 | | G412 := A01 + A61 | | C112 := G112 + G312 |
| G212 := G212 + G412 | G512 := G112 − G312 | G612 := G212 − G402 | D112 := C112 + C212 | D212 := C112 − C212 |
| G122 := A32 + A72 | | G322 := A12 + A52 | | G522 := A32 − A72 |
| G222 := A22 + A42 | | G422 := A02 + A62 | | C122 := G122 + G322 |
| G222 := G222 + G422 | G522 := G122 − G322 | G622 := G222 − G422 | D122 := C122 + C222 | D222 := C122 − C222 |
| G132 := A33 + A73 | | G332 := A13 + A53 | | G532 := A33 − A73 |
| G232 := A23 + A43 | | G432 := A03 + A63 | | C132 := G132 + G332 |
| G232 := G232 + G432 | G532 := G132 − G332 | G632 := G232 − G432 | D132 := C132 + C232 | D232 := C132 − C232 |
| G142 := A34 + A74 | | G342 := A14 + A54 | | G544 := A34 − A74 |
| G242 := A24 + A44 | | G442 := A04 + A64 | | C144 := G142 + G342 |
| G242 := G242 + G432 | G542 := G142 − G342 | G642 := G242 − G442 | D142 := C142 + C242 | D242 := C142 − C242 |
| G152 := A35 + A75 | | G352 := A15 + A55 | | G552 := A35 − A75 |
| G252 := A25 + A45 | | G452 := A05 + A65 | | C152 := G152 + G352 |
| G252 := G252 + G452 | G552 := G152 − G352 | G652 := G252 − G452 | D152 := C152 + C252 | D252 := C152 − C252 |
| G162 := A36 + A76 | | G362 := A16 + A56 | | G562 := A36 − A76 |
| G262 := A26 + A46 | | G462 := A06 + A66 | | C162 := G162 + G362 |
| G262 := G262 + G462 | G562 := G162 − G362 | G662 := G262 − G462 | D162 := C162 + C262 | D262 := C162 − C262 |
| G172 := A37 + A77 | | G372 := A17 + A57 | | G532 := A37 − A77 |
| G272 := A27 + A47 | | G472 := A07 + A67 | | C132 := G172 + G372 |
| G272 := G272 + G472 | G572 := G172 − G372 | G672 := G272 − G472 | D172 := C172 + C272 | D272 := C172 − C272 |
| M02 := C602 · T2 | M12 := C612 · T2 | M22 := C622 · T2 | M32 := C632 · T2 | |
| C00 := D102 | C10 := D112 | C20 := D122 | C30 := D132 | |
| C01 := −M02 − G502 | C11 := −M12 − G512 | C21 := −M22 − G522 | C31 := −M32 − G532 | |
| C02 := C502 | C12 := C512 | C22 := C522 | C32 := C532 | |
| C03 := M02 − G502 | C13 := M12 − G512 | C23 := M22 − G522 | C33 := M32 − G532 | |
| C04 := D202 | C14 := D212 | C24 := D222 | C34 := D232 | |
| C05 := M02 − G502 | C15 := M12 − G512 | C25 := M22 − G522 | C35 := M32 − G532 | |
| C06 := C502 | C16 := C512 | C26 := C522 | C36 := C532 | |
| C07 := M0 − G502 | C17 := M1 − G512 | C27 := M2 − G522 | C37 := M3 − G532 | |
| M42 := C642 · T2 | M52 := C652 · T2 | M62 := C662 · T2 | M72 := C672 · T2 | |
| C40 := D142 | C50 := D152 | C60 := D162 | C70 := D172 | |
| C41 := −M42 − G542 | C51 := −M52 − G552 | C61 := −M62 − G562 | C71 := −M72 − G572 | |
| C42 := C542 | C52 := C552 | C62 := C622 | C72 := C572 | |
| C43 := M42 − G542 | C53 := M52 − G552 | C63 := M62 − G562 | C73 := M72 − G572 | |
| C44 := D242 | C54 := D252 | C64 := D262 | C74 := D272 | |
| C45 := M42 − G542 | C55 := M52 − G552 | C65 := M62 − G562 | C75 := M72 − G572 | |
| C46 := C542 | C56 := C552 | C66 := C562 | C76 := C572 | |
| C47 := −M42 − G542 | C57 := −M52 − G552 | C67 := −M62 − G562 | C77 := −M72 − G57 | |
| C00 = 4.8     C10 = 1.333 | C20 = 1.333 | C30 = 1.333     C40 = 1.333 | C50 = 1.333 | C60 = 1.333  C70 = 1.333 |
| C11 = −0.8    C11 = 0 | C21 = 0 | C31 = 0          C41 = 0 | C51 = 0 | C61 = 0      C71 = 0 |
| C12 = −0.8    C12 = 0 | C22 = 0 | C32 = 0          C42 = 0 | C52 = 0 | C62 = 0      C72 = 0 |
| C13 = −0.8    C13 = 0 | C23 = 0 | C33 = 0          C43 = 0 | C53 = 0 | C63 = 0      C73 = 0 |
| C14 = −0.8    C14 = 0 | C24 = 0 | C34 = 0          C44 = 0 | C54 = 0 | C64 = 0      C74 = 0 |
| C15 = −0.8    C15 = 0 | C25 = 0 | C35 = 0          C45 = 0 | C55 = 0 | C65 = 0      C75 = 0 |
| C16 = −0.8    C16 = 0 | C26 = 0 | C36 = 0          C46 = 0 | C56 = 0 | C66 = 0      C76 = 0 |
| C17 = −0.8    C17 = 0 | C27 = 0 | C37 = 0          C47 = 0 | C57 = 0 | C67 = 0      C77 = 0 |

$$Cxx := \begin{pmatrix} C00 & C01 & C02 & C03 & C04 & C05 & C06 & C07 \\ C10 & C11 & C12 & C13 & C14 & C15 & C16 & C17 \\ C20 & C21 & C22 & C23 & C24 & C25 & C26 & C27 \\ C30 & C31 & C32 & C33 & C34 & C35 & C36 & C37 \\ C40 & C41 & C42 & C43 & C44 & C45 & C46 & C47 \\ C50 & C51 & C52 & C53 & C54 & C55 & C56 & C57 \\ C60 & C61 & C62 & C63 & C64 & C65 & C66 & C67 \\ C70 & C71 & C72 & C73 & C74 & C75 & C76 & C77 \end{pmatrix} \quad Cxx = \begin{pmatrix} 4.8 & -0.8 & -0.8 & -0.8 & -0.8 & -0.8 & -0.8 & -0.8 \\ 1.333 & 0 & 0 & 0 & 0 & 0 & 0 & 0 \\ 1.333 & 0 & 0 & 0 & 0 & 0 & 0 & 0 \\ 1.333 & 0 & 0 & 0 & 0 & 0 & 0 & 0 \\ 1.333 & 0 & 0 & 0 & 0 & 0 & 0 & 0 \\ 1.333 & 0 & 0 & 0 & 0 & 0 & 0 & 0 \\ 1.333 & 0 & 0 & 0 & 0 & 0 & 0 & 0 \\ 1.333 & 0 & 0 & 0 & 0 & 0 & 0 & 0 \end{pmatrix}$$

TABLE 7

Example calculations of 2-Dimension Discrete Cosine Transform for 64 samples according to one embodiment of the present invention.

DCT_2D$_{13}$ GRAPH     8 Multiples     163 Adds     One wired shift

PROCESS EXAMPLE OF TWO DIMENSION 64-POINT DISCRETE COSINE TRANSFORM DONE AS A SINGLE STEP SPECIAL CASE PROCESS $M := 3 \quad N := 3 \quad F(x,y) := \cos(2 \cdot \pi \cdot M \cdot x) \cdot \cos(2 \cdot \pi \cdot N \cdot y) \quad T := 0.7071067812$ $$S := \begin{pmatrix} F(.125,.125) & F(.25,.125) & F(.375,.125) & F(.5,.125) & F(.625,.125) & F(.75,.125) & F(.875,.125) & F(1,.125) \\ F(.125,.250) & F(.25,.250) & F(.375,.250) & F(.5,.250) & F(.625,.250) & F(.75,.250) & F(.875,.250) & F(1,.250) \\ F(.125,.375) & F(.25,.375) & F(.375,.375) & F(.5,.375) & F(.625,.375) & F(.75,.375) & F(.875,.375) & F(1,.375) \\ F(.125,.5) & F(.25,.5) & F(.375,.5) & F(.5,.5) & F(.625,.5) & F(.75,.5) & F(.875,.5) & F(1,.5) \\ F(.125,.625) & F(.25,.625) & F(.375,.625) & F(.5,.625) & F(.625,.625) & F(.75,.625) & F(.875,.625) & F(1,.625) \\ F(.125,.75) & F(.25,.75) & F(.375,.75) & F(.5,.75) & F(.625,.75) & F(.75,.75) & F(.875,.75) & F(1,.75) \\ F(.125,.875) & F(.25,.875) & F(.375,.875) & F(.5,.875) & F(.625,.875) & F(.75,.875) & F(.875,.875) & F(1,.875) \\ F(.125,1) & F(.25,1) & F(.375,1) & F(.5,1) & F(.625,1) & F(.75,1) & F(.875,1) & F(1,1) \end{pmatrix}$$

$$S = \begin{pmatrix} -1.414 & -0.707 & 0 & -1.707 & 0 & -0.707 & -1.414 & 0.293 \\ -0.707 & 0 & 0.707 & -1 & 0.707 & 0 & -0.707 & 1 \\ 0 & 0.707 & 1.414 & -0.293 & 1.414 & 0.707 & 0 & 1.707 \\ -0.707 & -1 & -0.293 & -2 & -0.293 & -1 & -1.707 & 0 \\ 0 & 0.707 & 1.414 & -0.293 & 1.414 & 0.707 & 0 & 1.707 \\ -0.707 & 0 & 0.707 & -1 & 0.707 & 0 & -0.707 & 1 \\ -1.414 & -0.707 & 0 & -1.707 & 0 & -0.707 & -1.414 & 0.293 \\ 0.293 & 1 & 1.707 & 0 & 1.707 & 1 & 0.293 & 2 \end{pmatrix}$$

S00 := S$_{0,0}$   S01 := S$_{0,1}$   S02 := S$_{0,2}$   S03 := S$_{0,3}$   S04 := S$_{0,4}$   S05 := S$_{0,5}$   S06 := S$_{0,6}$   S07 := S$_{0,7}$
S10 := S$_{1,0}$   S11 := S$_{1,1}$   S12 := S$_{1,2}$   S13 := S$_{1,3}$   S14 := S$_{1,4}$   S15 := S$_{1,5}$   S16 := S$_{1,6}$   S17 := S$_{1,7}$
S20 := S$_{2,0}$   S21 := S$_{2,1}$   S22 := S$_{2,2}$   S23 := S$_{2,3}$   S24 := S$_{2,4}$   S25 := S$_{2,5}$   S26 := S$_{2,6}$   S27 := S$_{2,7}$
S30 := S$_{3,0}$   S31 := S$_{3,1}$   S32 := S$_{3,2}$   S33 := S$_{3,3}$   S34 := S$_{3,4}$   S35 := S$_{3,5}$   S36 := S$_{3,6}$   S37 := S$_{3,7}$
S40 := S$_{4,0}$   S41 := S$_{4,1}$   S42 := S$_{4,2}$   S43 := S$_{4,3}$   S44 := S$_{4,4}$   S45 := S$_{4,5}$   S46 := S$_{4,6}$   S47 := S$_{4,7}$
S50 := S$_{5,0}$   S51 := S$_{5,1}$   S52 := S$_{5,2}$   S53 := S$_{5,3}$   S54 := S$_{5,4}$   S55 := S$_{5,5}$   S56 := S$_{5,6}$   S57 := S$_{5,7}$
S60 := S$_{6,0}$   S61 := S$_{6,1}$   S62 := S$_{6,2}$   S63 := S$_{6,3}$   S64 := S$_{6,4}$   S65 := S$_{6,5}$   S66 := S$_{6,6}$   S67 := S$_{6,7}$
S70 := S$_{7,0}$   S71 := S$_{7,1}$   S72 := S$_{7,2}$   S73 := S$_{7,3}$   S74 := S$_{7,4}$   S75 := S$_{7,5}$   S76 := S$_{7,6}$   S77 := S$_{7,7}$
A00 := S00 + S06   A01 := S01 + S05   A02 := S02 + S04   A03 := S03 + S07   A04 := S03 + S07
A10 := S10 + S16   A11 := S11 + S15   A12 := S12 + S14   A13 := S13 + S17   A14 := S13 + S17
A20 := S20 + S26   A21 := S21 + S25   A22 := S22 + S24   A23 := S23 + S27   A24 := S23 + S27
A30 := S30 + S36   A31 := S31 + S35   A32 := S32 + S34   A33 := S33 + S37   A34 := S33 + S37
A40 := S40 + S46   A41 := S41 + S45   A42 := S42 + S44   A43 := S43 + S47   A44 := S43 + S47
A50 := S50 + S56   A51 := S51 + S55   A52 := S52 + S54   A53 := S53 + S57   A54 := S53 + S57
A60 := S60 + S66   A61 := S61 + S65   A62 := S62 + S64   A63 := S63 + S67   A64 := S63 + S67
A70 := S70 + S76   A71 := S71 + S75   A72 := S72 + S74   A73 := S73 + S77   A74 := S73 + S77
B10 := A03 + A01   B50 := A03 − A01   B20 := A02 + A00   B60 := A02 − A00   B30 := A04 + A64
B11 := A13 + A11   B51 := A13 − A11   B21 := A12 + A10   B61 := A12 − A10   B31 := A14 + A54
B12 := A23 + A21   B52 := A23 − A21   B22 := A22 + A20   B62 := A22 − A20   B32 := A24 + A44
B13 := A33 + A31   B53 := A33 − A31   B32 := A32 + A30   B63 := A32 − A30   B33 := A34 + A74
B14 := A43 + A41   B54 := A43 − A41   B42 := A42 + A40   B64 := A42 − A40
B15 := A53 + A51   B55 := A53 − A51   B52 := A52 + A50   B65 := A52 − A50
B16 := A63 + A61   B56 := A63 − A61   B62 := A62 + A60   B66 := A62 − A60
B17 := A73 + A71   B57 := A73 − A71   B72 := A72 + A70   B67 := A72 − A70   B37 := A34 − A74
C10 := B10 + B20   C20 := B10 − B20   C30 := B30 + B32   C31 := B30 − B32   C50 := B50 + B56
C11 := B11 + B21   C21 := B11 − B21   C32 := B31 + B33   C33 := B31 − B33   C51 := B51 + B55
C12 := B12 + B22   C22 := B12 − B22   C53 := B53 + B57   C57 := B53 − B57   C52 := B52 + B54
C13 := B13 + B23   C23 := B13 − B23   C63 := B63 + B67   C37 := B63 − B67   C60 := B60 + B66
C14 := B14 + B24   C24 := B14 − B24                                                                      C61 := B61 + B65
C15 := B15 + B25   C25 := B15 − B25                                                                      C62 := B62 + B64
C16 := B16 + B26   C26 := B16 − B26
C17 := B17 + B27   C27 := B17 − B27
D10 := C10 + C16   D20 := C20 + C26   D30 := C30 + C32   D32 := C30 − C32
D11 := C11 + C15   D21 := C21 + C25   D31 := C37 + C31   D37 := C37 − C31
D12 := C12 + C14   D22 := C22 + C24   D50 := C50 + C52   D52 := C50 − C52
D13 := C13 + C17   D23 := C23 + C27   D51 := C51 + C53   D53 := C51 − C53
D17 := C13 − C17   D27 := C23 − C27   D60 := C60 + C62   D62 := C60 − C62
                                                                           D61 := C61 + C63   D63 := C61 − C63
E10 := D10 + D12   E12 := D10 − D12   E21 := D21 + D23   E23 := D21 − D23
E11 := D11 + D13   E13 := D11 − D13   E32 := D50 + D51   E33 := D50 − D51
E20 := D20 + D22   E22 := D20 − D22   E30 := D60 + D61   E31 := D60 − D61
F10 := E10 + E11   F11 := E11 − E10   F20 := E20 + E21   F21 := E20 − E21
M1 := E12 · T    M3 := E30 · T         M5 := E31 · T         M7 := D22 · T
M2 := E22 · T    M4 := E31 · T         M6 := E37 · T         M8 := D63 · T
M9 := E62 · .5      Note: In a custom design this is only a wiring shift, not really a multiply.
G22 := B37 + M9   G23 := B37 − M9

TABLE 7-continued

Example calculations of 2-Dimension Discrete Cosine Transform for 64
samples according to one embodiment of the present invention.
DCT_2D$_{13}$ GRAPH        8 Multiples        163 Adds        One wired shift
PROCESS EXAMPLE OF TWO DIMENSION 64-POINT DISCRETE COSINE TRANSFORM
DONE AS A SINGLE STEP SPECIAL CASE PROCESS

| | | | |
|---|---|---|---|
| H10 := M1 + D17 | H20 := M1 − D17 | H14 := M5 + G22 | H24 := M5 − G22 |
| H11 := M2 + D27 | H21 := M2 − D27 | H15 := M6 + G23 | H25 := M6 − G23 |
| H12 := M3 + D30 | H22 := M3 − D30 | H16 := M7 + C57 | H26 := M7 − C57 |
| H13 := M4 + D32 | H23 := M4 − D32 | H17 := M8 + C33 | H27 := M8 − C33 |
| Co00 := F10 | Co20 := E32 | Co40 := F20 | Co60 := Co20 |
| Co01 := H20 | Co21 := H26 | Co41 := H21 | Co61 := Co21 |
| Co02 := −E13 | Co22 := −D53 | Co42 := −E23 | Co62 := Co22 |
| Co03 := −H10 | Co23 := −H16 | Co43 := −H11 | Co63 := Co23 |
| Co04 := −F11 | Co24 := −E33 | Co44 := −F21 | Co64 := Co24 |
| Co05 := Co03 | Co25 := Co23 | Co45 := Co43 | Co65 := Co63 |
| Co06 := Co02 | Co26 := Co22 | Co46 := Co42 | Co66 := Co62 |
| Co07 := Co01 | Co27 := Co21 | Co47 := Co41 | Co67 := Co61 |
| Co10 := −H12 | Co30 := H22 | Co50 := Co30 | Co70 := Co10 |
| Co11 := H15 | Co31 := −H24 | Co51 := Co31 | Co71 := Co11 |
| Co12 := H17 | Co32 := −H27 | Co52 := Co32 | Co72 := Co12 |
| Co13 := H14 | Co33 := −H25 | Co53 := Co33 | Co73 := Co13 |
| Co14 := H13 | Co34 := −H23 | Co54 := Co34 | Co74 := Co14 |
| Co15 := Co13 | Co35 := Co33 | Co55 := Co53 | Co75 := Co73 |
| Co16 := Co12 | Co36 := Co32 | Co56 := Co52 | Co76 := Co72 |
| Co17 := Co11 | Co37 := Co31 | Co55 := Co51 | Co77 := Co71 |

OUTPUT SHEET FOR 2-DIMENSION DISCRETE COSINE TRANSFORM

M := 2   N := 3

$$S = \begin{pmatrix} -1.414 & -0.707 & 0 & -1.707 & 0 & -0.707 & -1.414 & 0.293 \\ -0.707 & 0 & 0.707 & -1 & 0.707 & 0 & -0.707 & 1 \\ 0 & 0.707 & 1.414 & -0.293 & 1.414 & 0.707 & 0 & 1.707 \\ -0.707 & -1 & -0.293 & -2 & -0.293 & -1 & -1.707 & 0 \\ 0 & 0.707 & 1.414 & -0.293 & 1.414 & 0.707 & 0 & 1.707 \\ -0.707 & 0 & 0.707 & -1 & 0.707 & 0 & -0.707 & 1 \\ -1.414 & -0.707 & 0 & -1.707 & 0 & -0.707 & -1.414 & 0.293 \\ 0.293 & 1 & 1.707 & 0 & 1.707 & 1 & 0.293 & 2 \end{pmatrix}$$

ARRAY OF INPUT VALUES $$Cxx := \begin{pmatrix} Co00 & Co01 & Co02 & Co03 & Co04 & Co05 & Co06 & Co07 \\ Co10 & Co11 & Co12 & Co13 & Co14 & Co15 & Co16 & Co17 \\ Co20 & Co21 & Co22 & Co23 & Co24 & Co25 & Co26 & Co27 \\ Co30 & Co31 & Co32 & Co33 & Co34 & Co35 & Co36 & Co37 \\ Co40 & Co41 & Co42 & Co43 & Co44 & Co45 & Co46 & Co47 \\ Co50 & Co51 & Co52 & Co53 & Co54 & Co55 & Co56 & Co57 \\ Co60 & Co61 & Co62 & Co63 & Co64 & Co65 & Co66 & Co67 \\ Co70 & Co71 & Co72 & Co73 & Co74 & Co75 & Co76 & Co77 \end{pmatrix}$$

MAP NAMES TO LOCATIONS $$Cxx = \begin{pmatrix} 0 & 0 & 0 & 32 & 0 & 32 & 0 & 0 \\ 0 & 0 & 0 & 0 & 0 & 0 & 0 & 0 \\ 0 & 0 & 0 & 0 & 0 & 0 & 0 & 0 \\ 32 & 0 & 0 & 0 & 0 & 0 & 0 & 0 \\ 0 & 0 & 0 & 0 & 0 & 0 & 0 & 0 \\ 32 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

ARRAY OF OUTPUT VALUES

TABLE 8

Example calculations of Discrete Cosine Transform for eight
samples according to one embodiment of the present invention
Super Fast Discrete Cosine Transform Let x range from 1/8 to 1 in 8 steps. Let F(x) be sampled at the eight points.

$x := 0, .01 \ldots 1 \quad F(x) := \cos(1 \cdot 2 \cdot \pi \cdot x)$

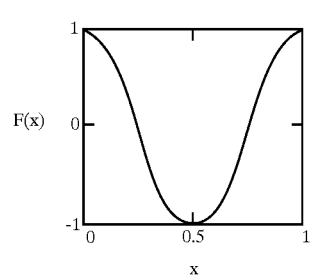

$$S := \begin{pmatrix} F(.125) \\ F(.250) \\ F(.375) \\ F(.5) \\ F(.625) \\ F(.75) \\ F(.875) \\ F(.1) \end{pmatrix} \quad S = \begin{pmatrix} 0.707 \\ 0 \\ -0.707 \\ -1 \\ -0.707 \\ 0 \\ 0.707 \\ 1 \end{pmatrix}$$

TABLE 8-continued

Example calculations of Discrete Cosine Transform for eight
samples according to one embodiment of the present invention
Super Fast Discrete Cosine Transform T2 := 0.7071067812
M1 := $(S_0 - S_2 - S_4 + S_6) \cdot$ T2 Multiply     M1 = 2
A0 := $(S_0 + S_1 + S_2 + S_3 + S_4 + S_5 + S_6 + S_7)$     A0 = 0
A1 := M1 − $S_3 + S_7$     A1 = 4
A2 := − $S_1 + S_3 - S_5 + S_7$     A2 = 0
A3 := −M1 − $S_3 + S_7$     A3 = 0
A4 := −$S_0 + S_1 - S_2 + S_3 - S_4 + S_5 - S_6 + S_7$     A4 = 0
A5 := −M1 − $S_3 + S_7$     A5 = 0
A6 := −$S_1 + S_3 - S_5 + S_7$     A6 = 0
A7 := M1 − $S_{3+S7}$     A7 = 4

$$FT := \begin{pmatrix} A0 & A1 & A2 & A3 \\ A4 & A5 & A6 & A7 \end{pmatrix} \quad FT = \begin{pmatrix} 0 & 4 & 0 & 0 \\ 0 & 0 & 0 & 4 \end{pmatrix}$$

TABLE 9

Description of an example process for calculating Discrete Cosine Transform
for eight samples according to one embodiment of the present invention
Process Example of SDCT Let x range from 1/8 to 1 in 8 steps. Let F(x) be sampled at the eight points (S).

| | | | | |
|---|---|---|---|---|
| $F(x) := \cos(4 \cdot 2 \cdot \pi \cdot x)$ | G6 := $S_0$ | T2 := 0.7071067812 | | |
| G4 := $S_0$ | G7 := $S_1$ | 1st sample arrival. Load to two memory locations. | | |
| G3 := $S_1$ | G8 := $S_2$ | 2nd sample arrival. Load to two memory locations. | | |
| G2 := $S_2$ | G5 := −$S_3$ | 3rd sample arrival. Load to two memory locations. | | |
| G1 := $S_3$ | | 4th sample arrival. Load to two memory locations. | | |

$$S := \begin{pmatrix} F(.125) \\ F(.250) \\ F(.375) \\ F(.5) \\ F(.625) \\ F(.75) \\ F(.875) \\ F(.1) \end{pmatrix}$$

| | | | | | |
|---|---|---|---|---|---|
| G2 := G2 + $S_4$ | G8 := G8 − $S_4$ | 5th sample arrival. Add-accumulate two locations. | | A—A = 2 | |
| G3 := G3 + $S_5$ | G7 := G7 − $S_5$ | 6th sample arrival. Add-accumulate two locations. | | A—A = 4 | |
| G4 := G4 + $S_6$ | G6 := G6 − $S_6$ | 7th sample arrival. Add-accumulate two locations. | | A—A = 6 | |
| TEMP := G2 − G4 | G4 := G2 + G4 | G4 is C2 | G2 := TEMP | G2 is C6 | A—A = 8 |
| TEMP := G6 + G8 | G6 := G6 − G8 | G6 is C3 | G8 := TEMP | G8 is C4 | A—A = 10 |
| TEMP := G8 · T2 | First Multiply is stored in TEMP | | Mult = 1 | | |
| G8 := TEMP − G7 | | G7 := G7 | | | A—A = 12 |
| B1 := G7 | G7 HOLDS B1 | | B1 = 0 | | |
| B2 := G6 | G6 HOLDS B2 | | B2 = 0 | | |
| B3 := G8 | G8 HOLDS B3 | | B3 = 0 | | |
| G1 := G1 + G3 | G5 := G5 + $S_7$ | 8th sample arrival. Add-accumulate two locations. | | A—A = 14 | |
| TEMP := G1 + G3 | G1 := G1 − G3 | G1 is C5 | G3 := TEMP | G3 is C1 | A—A = 16 |
| TEMP := G3 + G4 | G3 := G3 − G4 | G3 is D2 | G4 := TEMP | G4 is D1 | A—A = 18 |
| A0 := G4 | G4 HOLDS A0 | | $\frac{A0}{2} = 0$ | | |
| A2 := G1 | G1 HOLDS A2 | | A2 = 0 | | |
| A4 := G3 | G3 HOLDS A4 | | $\frac{A4}{2} = 4$ | | |
| TEMP := G2 · T2 | Second Multiply is stored in TEMP | | Mult = 2 | | |
| G2 := G5 − TEMP | G5 := G5 + TEMP | | | | |
| A1 := G2 | G2 HOLDS A1 | | A1 = 0 | | |
| A3 := G5 | G5 HOLDS A3 | | A3 = 0 | | |

TABLE 9-continued

Description of an example process for calculating Discrete Cosine Transform
for eight samples according to one embodiment of the present invention
Process Example of SDCT $$DFT := \begin{bmatrix} A1 & A2 & A3 & \frac{A4}{2} \\ B1 & B2 & B3 & \frac{A0}{2} \end{bmatrix} \quad DFT = \begin{bmatrix} 0 & 0 & 0 & 4 \\ 0 & 0 & 0 & 0 \end{bmatrix}$$

File: SFT_Ex.doc

TABLE 10

Description of an example process for calculating Fourier Transform for
eight samples according to one embodiment of the present invention
Process Example of SFT Let x range from 1/8 to 1 in 8 steps. Let F(x) be sampled at the eight points (S).

$F(x) := \cos(3 \cdot 2 \cdot \pi \cdot x)$
$G4 := S_0$
$G3 := S_1$
$G2 := S_2$ $T2 := 0.7071067812$
1st sample arrival. Load to memory locations.
2nd sample arrival. Load to memory locations.
3rd sample arrival. Load to memory locations.

$$S := \begin{bmatrix} F(.125) \\ F(.250) \\ F(.375) \\ F(.5) \\ F(.625) \\ F(.75) \\ F(.875) \\ F(.1) \end{bmatrix}$$

| | | | | |
|---|---|---|---|---|
| G1 := S₃ | G5 := –S₃ | 4th sample arrival. Load to memory locations. | | |
| G2 := G2 + S₄ | | 5th sample arrival. Add-accumulate. | | A—A = 1 |
| G3 := G3 + S₅ | | 6th sample arrival. Add-accumulate. | | A—A = 2 |
| G4 := G4 + S₆ | | 7th sample arrival. Add-accumulate. | | A—A = 3 |
| G1 := G1 + S₇ | G5 := G5 – S₇ | 8th sample arrival. Add-accumulate two locations. | | A—A = 5 |
| TEMP := G1 – G3 | G1 := G1 – G3 | G1 is C5 | G3 := TEMP   G3 is C1 | A—A = 7 |
| TEMP := G2 – G4 | G4 := G2 + G4 | G4 is C2 | G2 := TEMP   G2 is C6 | A—A = 9 |
| TEMP := G3 + G4 | G3 := G3 – G4 | G3 is D2 | G4 := TEMP   G4 is D1 | A—A = 11 |
| A0 := G4 | | G4 HOLDS A0 | A0 = 0 | |
| A2 := G1 | | G1 HOLDS A2 | A2 = 0 | |
| A4 := G3 | | G3 HOLDS A4 | A4 = 0 | |
| A6 := G1 | | G1 HOLDS A6 | A6 = 0 | |
| TEMP := G2 · T2 | | Multiply is stored in TEMP | Mult = 1 | |
| G2 := –TEMP – G5 | | G5 := TEMP – G5 | A—A = 13 | |
| A1 := G2 | | G2 HOLDS A1 | A1 = 0 | |
| A3 := G5 | | G5 HOLDS A3 | A3 = 4 | |
| A5 := G5 | | G5 HOLDS A3 | A5 = 4 | |
| A7 := G2 | | G2 HOLDS A1 | A7 = 0 | |

$$DFT := \begin{bmatrix} A0 & A1 & A2 & A3 \\ A4 & A5 & A6 & A7 \end{bmatrix} \quad DFT = \begin{bmatrix} 0 & 0 & 0 & 4 \\ 0 & 4 & 0 & 0 \end{bmatrix}$$

File: FT_SDCT.DOC

TABLE 11

1-Dimension 16-Sample Discrete Fourier Transform

| Co # | Formula | T2A | T2B | T2C | T2D | T3A | T3B | T3C | T3D | T4A | T4B | T4C | T4D | T5A | T5B | T5C | T5D |
|---|---|---|---|---|---|---|---|---|---|---|---|---|---|---|---|---|---|
| A1 | S1 + S15 | | | | | | | | | | | | | | | | |
| A2 | S2 + S14 | | | | | | | | | | | | | | | | |
| A3 | S3 + S13 | | | | | | | | | | | | | | | | |
| A4 | S4 + S12 | | | | | | | | | | | | | | | | |
| A5 | S5 + S11 | | | | | | | | | | | | | | | | |
| A6 | S6 + S10 | | | | | | | | | | | | | | | | |
| A7 | S7 + S9 | | | | | | | | | | | | | | | | |
| A8 | S8 + S16 | | | | | | | | | | | | | | | | |
| A9 | S8 – S16 | | | | | | | | | | | | | | | | |
| B1 | A1 + A7 | | | | | | | | | | | | | | | | |
| B2 | A2 + A6 | | | | | | | | | | | | | | | | |
| B3 | A3 + A5 | | | | | | | | | | | | | | | | |
| B4 | A4 + A8 | | | | | | | | | | | | | | | | |
| B5 | A1 – A7 | | | | | | | | | | | | | | | | |
| B6 | A2 – A6 | | | | | | | | | | | | | | | | |

TABLE 11-continued

1-Dimension 16-Sample Discrete Fourier Transform

| Co # | Formula | T2A | T2B | T2C | T2D | T3A | T3B | T3C | T3D | T4A | T4B | T4C | T4D | T5A | T5B | T5C | T5D |
|---|---|---|---|---|---|---|---|---|---|---|---|---|---|---|---|---|---|
| B7 | A3 − A5 | | | | | | | | | | | | | | | | |
| B8 | A4 − A8 | | | | | | | | | | | | | | | | |
| C1 | B1 + B3 | | | | | | | | | | | | | | | | |
| C2 | B2 + B4 | | | | | | | | | | | | | | | | |
| C3 | B1 − B3 | | | | | | | | | | | | | | | | |
| C4 | B2 − B4 | | | | | | | | | | | | | | | | |
| D1 | C1 + C2 | | | | | | | | | | | | | | | | |
| D2 | C1 − C2 | | | | | | | | | | | | | | | | |
| T1 | 0 | | | | | | | | | | | | | | | | |
| T2 | 1 | | | | | | | | | | | | | | | | |
| T3 | 0.9238795325 | | | | | | | | | | | | | | | | |
| T4 | 0.7071067814 | | | | | | | | | | | | | | | | |
| T5 | 0.3826834324 | | | | | | | | | | | | | | | | |
| Co1 | D1 | | | | D1 | | | | | | | | | | | | |
| Co2 | −A9 + B5 * T3 + B6 * T4 + B7 * T5 | −A9 | | | | B5 | | | | B6 | | | | B7 | | | |
| Co3 | −B8 + C3 * T4 | −B8 | | | | | | | | C3 | | | | | | | |
| Co4 | −A9 − B7 * T3 − B6 * T4 + B5 * T5 | −A9 | | | | −B7 | | | | −B6 | | | | B5 | | | |
| Co5 | −C4 | | −C4 | | | | | | | | | | | | | | |
| Co6 | −A9 + B7 * T3 − B6 * T4 − B5 * T5 | −A9 | | | | B7 | | | | B6 | | | | −B5 | | | |
| Co7 | −B8 − D3 * T4 | −B8 | | | | | | | | −C3 | | | | | | | |
| Co8 | −A9 − B5 * T3 − B6 * T4 − B7 * T5 | −A9 | | | | −M1 | | | | M5 | | | | −M4 | | | |
| Co9 | −D2 | | | | −D2 | | | | | | | | | | | | |
| Co10 | −A9 − B5 * T3 − B6 * T4 − B7 * T5 | −A9 | | | | −B5 | | | | −B6 | | | | −B7 | | | |
| Co11 | −B8 − D3 * T4 | −B8 | | | | | | | | −C3 | | | | | | | |
| Co12 | −A9 + B7 * T3 − B6 * T4 − B5 * T5 | −A9 | | | | B7 | | | | B6 | | | | −B5 | | | |
| Co13 | −C4 | | −C4 | | | | | | | | | | | | | | |
| Co14 | −A9 − B7 * T3 − B6 * T4 + B5 * T5 | −A9 | | | | −B7 | | | | −B6 | | | | B5 | | | |
| Co15 | −B8 + C3 * T4 | −B8 | | | | | | | | C3 | | | | | | | |
| Co16 | −A9 + B5 * T3 + B6 * T4 + B7 * T5 | −A9 | | | | B5 | | | | B6 | | | | B7 | | | |

TABLE 11B

1-Dimension 16-Sample Discrete Cosine Transform Illustrated

| Co | Formula | S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|---|---|
| Identifier | Formula | | | | | | | | | | | | | | | | |
| A1 | S1 + S15 | + | | | | | | | | | | | | | | + | |
| A2 | S2 + S14 | | + | | | | | | | | | | | | + | | |
| A3 | S3 + S13 | | | + | | | | | | | | | | + | | | |
| A4 | S4 + S12 | | | | + | | | | | | | | + | | | | |
| A5 | S5 + S11 | | | | | + | | | | | | + | | | | | |
| A6 | S6 + S10 | | | | | | + | | | | + | | | | | | |
| A7 | S7 + S9 | | | | | | | + | | + | | | | | | | |
| A8 | S8 + S16 | | | | | | | | + | | | | | | | | + |
| A9 | S8 − S16 | | | | | | | | + | | | | | | | | − |
| B1 | A1 + A7 | + | | | | | | + | | + | | | | | | + | |
| B2 | A2 + A6 | | + | | | | + | | | | + | | | | + | | |
| B3 | A3 + A5 | | | + | | + | | | | | | * | | + | | | |
| B4 | A4 + A8 | | | | + | | | | + | | | | + | | | | + |
| B5 | A1 − A7 | + | | | | | | − | | − | | | | | | + | |
| B6 | A2 − A6 | | + | | | | − | | | | − | | | | + | | |
| B7 | A3 − A5 | | | + | | − | | | | | | − | | + | | | |
| B8 | A4 − A8 | | | | + | | | | − | | | | + | | | | − |
| C1 | B1 + B3 | + | | + | | + | | + | | + | | + | | + | | + | |
| C2 | B2 + B4 | | + | | + | | + | | + | | + | | + | | + | | + |
| C3 | B1 − B3 | + | | − | | − | | + | | + | | − | | − | | + | |
| C4 | B2 − B4 | | + | | − | | + | | − | | + | | − | | * | | − |
| D1 | C1 + C2 | + | + | + | + | + | + | + | + | + | + | + | + | + | + | + | + |
| D2 | C1 − C2 | + | − | + | − | + | − | + | − | + | − | + | − | + | − | + | − |
| Token | Value | | | | | | | | | | | | | | | | |
| T1 | 0 | | | | | | | | | | | | | | | | |
| T2 | 1 | | | | | | | | | | | | | | | | |
| T3 | 0.9238795325 | | | | | | | | | | | | | | | | |

TABLE 11B-continued

1-Dimension 16-Sample Discrete Cosine Transform Illustrated

| Co | Formula | S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|---|---|
| T4 | 0.7071067814 | | | | | | | | | | | | | | | | |
| T5 | 0.3826834324 | | | | | | | | | | | | | | | | |
| Multiply ID | Formula | | | | | | | | | | | | | | | | |
| M1 | B5 * T3 | T3 | | | | | | −T3 | | −T3 | | | | | | T3 | |
| M2 | B5 * T5 | T5 | | | | | | −T5 | | −T5 | | | | | | T5 | |
| M3 | B7 * T3 | | | T3 | | −T3 | | | | | | −T3 | | T3 | | | |
| M4 | B7 * T5 | | | T5 | | −T5 | | | | | | −T5 | | T5 | | | |
| M5 | B6 * T4 | | T4 | | | | −T4 | | | | −T4 | | | | T4 | | |
| M6 | C3 * T4 | T4 | | | −T4 | | −T4 | | T4 | | T4 | −T4 | | −T4 | | T4 | |
| Identifier | Formula | | | | | | | | | | | | | | | | |
| E1 | −A9 + M5 | | T4 | | | | −T4 | | −1 | | −T4 | | | | T4 | | 1 |
| E2 | −A9 − M5 | | −T4 | | | | T4 | | −1 | | T4 | | | | −T4 | | 1 |
| E3 | M1 + M4 | T3 | | T5 | | −T5 | | −T3 | | −T3 | | −T5 | | T3 | | T3 | |
| E4 | M2 − M3 | T5 | | −T3 | | T3 | | −T5 | | −T5 | | T3 | | −T3 | | T5 | |
| E5 | −M6 − B8 | −T4 | | T4 | −1 | T4 | | −T4 | 1 | −T4 | | T4 | −1 | T4 | | −T4 | 1 |
| E6 | M6 − B8 | T4 | | −T4 | −1 | −T4 | | T4 | 1 | T4 | | −T4 | −1 | −T4 | | T4 | 1 |
| Coefficient | Formula | T2A | T2B | T2C | T2D | T3A | T3B | T3C | T3D | T4A | T4B | T4C | T4D | T5A | T5B | T5C | T5D |
| Co1 | D1 | | | | D1 | | | | | | | | | | | | |
| Co2 | E1 + E3 | −A9 | | | | | M1 | | | | M5 | | | | M4 | | |
| Co3 | E5 | | −B8 | | | | | | | | | −M6 | | | | | |
| Co4 | E2 + E4 | −A9 | | | | | −M3 | | | | −M5 | | | | M2 | | |
| Co5 | −C4 | | | −C4 | | | | | | | | | | | | | |
| Co6 | E2 − E4 | −A9 | | | | | M3 | | | | −M5 | | | | −M2 | | |
| Co7 | E6 | | −B8 | | | | | | | | | | M6 | | | | |
| Co8 | E1 − E3 | −A9 | | | | | −M1 | | | | M5 | | | | −M4 | | |
| Co9 | −D2 | | | | −D2 | | | | | | | | | | | | |
| Co10 | E1 − E3 | −A9 | | | | | −M1 | | | | M5 | | | | −M4 | | |
| Co11 | E6 | | −B8 | | | | | | | | | | M6 | | | | |
| Co12 | E2 − E4 | −A9 | | | | | M3 | | | | −M5 | | | | −M2 | | |
| Co13 | −C4 | | | −C4 | | | | | | | | | | | | | |
| Co14 | E2 + E4 | −A9 | | | | | −M3 | | | | −M5 | | | | M2 | | |
| Co15 | E5 | | −B8 | | | | | | | | | −M6 | | | | | |
| Co16 | E1 + E3 | −A9 | | | | | M1 | | | | M5 | | | | M4 | | |

That which is claimed:

1. A method of generating a second set of equations requiring reduced numbers of computations from a first set of general equations, wherein each general equation defines a coefficient in terms of a set of samples and a plurality of functions having respective values dependent upon each sample, said method comprising the steps of:
assigning a first set of tokens to the plurality of functions such that every value of the plurality of functions having a different magnitude is assigned a different token, thereby permitting each general equation to be defined by the set of samples and their associated tokens;
evaluating each of the general equations as defined by the set of samples and associated tokens and grouping the samples having the same associated token together into separate groups;
assigning a second set of tokens to represent a plurality of unique combinations of the samples; and
generating the second set of equations based on at least the first and second sets of tokens.

2. A method according to claim 1 further comprising after said assigning a second set of tokens step the step of assigning an nth set of tokens to represent a plurality of unique combinations of the (n−1)th set of tokens, and wherein said generating step comprises generating the second set of equations based on at least the first through the nth sets of tokens.

3. A method according to claim 1 wherein the general equation defines a discrete Fourier transform, and wherein said generating step generates a second set of equations that define a discrete Fourier transform.

4. A method according to claim 1 wherein the general equation defines a discrete cosine transform, and wherein said generating step generates a second set of equations that define a discrete cosine transform.

5. A method according to claim 1 wherein the general equation defines a function selected from the group consisting of Fourier transform, two-dimensional Fourier transform, cosine transform, two-dimensional cosine transform, Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, Matrices used in Quantum Mechanics, Linear Algebra and wavelets, and wherein said generating step generates a second set of equations that define the function.

6. A method according to claim 1 wherein the method is developed using universal approximators.

7. A method according to claim 1 further comprising the step of using the second set of equations generated in said generating step to determine the coefficients based on a set of samples.

8. An apparatus for generating a second set of equations requiring reduced numbers of computations from a first set of general equations, wherein each general equation defines a coefficient in terms of a set of samples and a plurality of functions having respective values dependent upon each sample, said apparatus comprising a processor capable of performing the following functions:
assigning a first set of tokens to the plurality of functions such that every value of the plurality of functions having a different magnitude is assigned a different token, thereby permitting each general equation to be defined by the set of samples and their associated tokens;

evaluating each of the general equations as defined by the set of samples and associated tokens and grouping the samples having the same associated token together into separate groups;

assigning a second set of tokens to represent a plurality of unique combinations of samples; and generating the second set of equations based on at least the first and second sets of tokens.

9. An apparatus according to claim 8 wherein said processor is further capable of after assigning a second set of tokens, assigning an nth set of tokens to represent a plurality of unique combinations of the (n−1)th set of tokens and generating the second set of equations based on at least the first through the nth sets of tokens.

10. An apparatus according to claim 8 wherein the general equation defines a discrete Fourier transform, and wherein said processor is capable of generating a second set of equations that define a discrete Fourier transform.

11. An apparatus according to claim 8 wherein the general equation defines a discrete cosine transform, and wherein said processor is capable of generating a second set of equations that define a discrete cosine transform.

12. An apparatus according to claim 8 wherein said processor is further capable of using the second set of equations generated in said generating step to determine the coefficients based on a set of samples.

13. A computer program product for generating a second set of equations requiring reduced numbers of computations from a first set of general equations, wherein each general equation defines a coefficient in terms of a set of samples and a plurality of functions having respective values dependent upon each sample, wherein the computer program product comprises:

a computer readable storage medium having computer readable program code means embodied in said medium, said computer-readable program code means comprising:

first computer instruction means for assigning a first set of tokens to the plurality of functions such that every value of the plurality of functions having a different magnitude is assigned a different token, thereby permitting each general equation to be defined by the set of samples and their associated tokens;

second computer instruction means for evaluating each of the general equations as defined by the set of samples and associated tokens and grouping the samples having the same associated token together into separate groups;

third computer instruction means for assigning a second set of tokens to represent a plurality of unique combinations of samples; and fourth computer instruction means for generating the second set of equations based on at least the first and second sets of tokens.

14. A computer program product according to claim 13 comprising after said third computer instruction means, fifth computer instruction means for assigning an nth set of tokens to represent a plurality of unique combinations of the (n−1)th set of tokens, and wherein said fourth computer instruction means generates the second set of equations based on at least the first through the nth sets of tokens.

15. A computer program product according to claim 13 wherein the general equation defines a discrete Fourier transform, and wherein said fourth computer instruction means generates a second set of equations that define a discrete Fourier transform.

16. A computer program product according to claim 13 wherein the general equation defines a discrete cosine transform, and wherein said fourth computer instruction means generates a second set of equations that define a discrete cosine transform.

17. A computer program product according to claim 13 further comprising fifth computer instruction means for using the second set of equations generated in said generating step to determine the coefficients based on a set of samples.

18. A method of generating a second set of equations requiring reduced numbers of computations from a first set of general equations, wherein each general equation defines a coefficient in terms of a set of samples having individual sample numbers and a plurality of functions having respective function values dependent upon each sample such that the contribution of each sample to each coefficient is based on the sample and the function value associated with each coefficient, said method comprising the steps of:

generating an array of function values to be multiplied by each sample to produce contributions of each sample to each coefficient, wherein each row of the array sums to a coefficient, each column of the array represents the function associated with each sample that contributes to each coefficient, so that a cross-point of each row and each column provides the function value associated with each sample to obtain a contribution of the sample to the coefficient such that the sum of the function values in each row provides one coefficient;

assigning a first set of tokens to the plurality of function values such that every function value having a different magnitude is assigned a different token;

obtaining the contributions of each sample to each coefficient by multiplying the sample number of each sample and the function associated with each coefficient;

for each coefficient, grouping the sample numbers multiplied to the function value associated with the coefficient that have the same associated token into separate groups;

reducing the number of mathematical terms in each group by assigning a second set of tokens to represent a plurality of unique combinations of sample numbers in the groups; and generating the second set of equations based on at least the first and second sets of tokens.

19. A method according to claim 18 further comprising after said reducing step the step of assigning an nth set of tokens to represent a plurality of unique combinations of the (n−1)th set of tokens, and wherein said generating step comprises generating the second set of equations based on at least the first through the nth sets of tokens.

20. A method according to claim 18 wherein the general equation defines a function selected from the group consisting of Fourier transform, two-dimensional Fourier transform, cosine transform, two-dimensional cosine transform, Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, Matrices used in Quantum Mechanics, Linear Algebra and wavelets, and wherein said generating step generates a second set of equations that define the function.

21. A method of generating a second set of equations from a first set of equations that relates a set of input values to coefficients based on function values associated with each input value and coefficient, wherein the second set of equations requires a reduced number of computations:

evaluating the equations for each coefficient in the first set of equations in terms of the function values and associated input values;

assigning a first set of tokens to each unique function value;

multiplying a sample number associated with each input value indicating the position of each input value in the set of input values and the function associated with each coefficient;

grouping the sample numbers having the same associated token into groups;

reducing the number of mathematical terms in each group by assigning a second set of tokens to represent a plurality of unique combinations of sample numbers in the groups; and generating the second set of equations based on at least the first and second sets of tokens.

22. A method of generating a second set of equations requiring reduced numbers of computations from a first set of general equations, wherein each general equation defines a coefficient in terms of a set of samples each having a symbolic input number and a plurality of functions having respective values dependent upon each sample, the method comprising the steps of:

representing a coefficient equation for each coefficient symbolically in the first set of equations;

evaluating the function values for the coefficient equations to obtain the coefficients in terms of the symbolic input numbers of the samples and the function values;

treating the coefficient equations as a simultaneous set;

assigning a token to each different function value;

sorting the symbolic input numbers associated with each token within the coefficient equations into groups and assigning a new token to each different group;

assigning a new token to each different group of tokens that is used;

applying values associated with the tokens to produce a symbolic formula of each coefficient;

assigning a new token to each different group and coefficient; and generating the equations of the coefficients in terms of the token values.

23. A method according to claim 22 further comprising the step of using the second set of equations generated in said generating step to determine the coefficients based on a set of samples.

* * * * *